United States Patent
Nakamoto et al.

(10) Patent No.: US 12,478,994 B2
(45) Date of Patent: Nov. 25, 2025

(54) MIST BLOWER

(71) Applicant: MAKITA CORPORATION, Anjo (JP)

(72) Inventors: Akihiro Nakamoto, Anjo (JP); Masatoshi Ito, Anjo (JP); Ryoji Zama, Anjo (JP); Yuki Koide, Anjo (JP)

(73) Assignee: MAKITA CORPORATION, Anjo (JP)

( * ) Notice: Subject to any disclaimer, the term of this patent is extended or adjusted under 35 U.S.C. 154(b) by 401 days.

(21) Appl. No.: 17/991,060

(22) Filed: Nov. 21, 2022

(65) Prior Publication Data

US 2023/0158523 A1   May 25, 2023

(30) Foreign Application Priority Data

Nov. 24, 2021  (JP) ................................. 2021-190297
Jul. 5, 2022  (JP) ................................. 2022-108451

(51) Int. Cl.
*B05B 7/24* (2006.01)
*B05B 12/00* (2018.01)
*B05B 12/08* (2006.01)

(52) U.S. Cl.
CPC .......... *B05B 7/2437* (2013.01); *B05B 7/2416* (2013.01); *B05B 12/002* (2013.01); *B05B 12/087* (2013.01); *B05B 7/2475* (2013.01)

(58) Field of Classification Search
CPC ............... B05B 7/2437; B05B 7/2416; B05B 12/002; B05B 12/087; B05B 7/2475
USPC ....................................................... 239/351
See application file for complete search history.

(56) References Cited

U.S. PATENT DOCUMENTS

| | | | | |
|---|---|---|---|---|
| 3,239,960 A | * | 3/1966 | Stevens | A01M 13/00 431/70 |
| 3,304,011 A | * | 2/1967 | Paasche | B05B 7/24 236/44 R |
| 3,735,929 A | * | 5/1973 | Pleines | B05B 7/2489 239/416 |
| 3,776,459 A | * | 12/1973 | Bonvicini | A01M 7/0003 239/379 |
| 3,900,165 A | * | 8/1975 | Parke | B05B 7/10 239/375 |
| 3,917,168 A | * | 11/1975 | Tenney | B05B 7/162 239/138 |

(Continued)

FOREIGN PATENT DOCUMENTS

| | | |
|---|---|---|
| JP | 2016-182090 A | 10/2016 |
| JP | 6014405 B2 | 10/2016 |
| JP | 2018-204595 A | 12/2018 |

*Primary Examiner* — Chee-Chong Lee
(74) *Attorney, Agent, or Firm* — Oliff PLC

(57) ABSTRACT

A mist blower in one aspect of the present disclosure includes an air blower, an air feed pipe, a tank, a liquid feed pipe, a nozzle, a first electromagnetic valve, a controller, and a first manual switch. The first electromagnetic valve (i) opens the liquid feed pipe in response to the first electromagnetic valve being activated and (ii) closes the liquid feed pipe in response to the first electromagnetic valve being deactivated. The controller activates or deactivates the air blower and the first electromagnetic valve. The first manual switch (i) is manually moved by a user of the mist blower and (ii) commands the controller to activate or deactivate the air blower based on a movement of the first manual switch.

23 Claims, 23 Drawing Sheets

(56) References Cited

U.S. PATENT DOCUMENTS

| | | | | |
|---|---|---|---|---|
| 4,116,385 A | * | 9/1978 | Waldron | B05B 15/652 |
| | | | | 137/615 |
| 7,073,734 B2 | * | 7/2006 | Dorendorf | B05B 7/1281 |
| | | | | 239/398 |
| 2009/0025794 A1 | * | 1/2009 | Dorendorf | F04D 29/705 |
| | | | | 137/565.17 |
| 2020/0054000 A1 | | 2/2020 | Zwahlen et al. | |

* cited by examiner

| LIQUID VOLUME LEVELS | 0 | 1 | 2 | 3 | 4 | 5 |
|---|---|---|---|---|---|---|
| OPENING LEVELS OF FIRST ELECTROMAGNETIC VALVE [%] | 0 | 10 | 25 | 50 | 75 | 100 |

FIG. 13

MIST BLOWER

CROSS-REFERENCE TO RELATED APPLICATIONS

This application claims the benefit of Japanese Patent Application No. 2021-190297 filed on Nov. 24, 2021 with the Japan Patent Office and Japanese Patent Application No. 2022-108451 filed on Jul. 5, 2022 with the Japan Patent Office, the entire disclosures of which are incorporated herein by reference.

BACKGROUND

The present disclosure relates to a mist blower.

Japanese Unexamined Patent Application Publication No. 2016-182090 discloses a backpack-type mist blower including a blower unit, a tank, an air feed pipe, a liquid feed pipe, and a manual valve. The blower unit is driven by an engine and generates an airflow into the air feed pipe. The tank contains liquid to be sprayed. The tank communicates with the air feed pipe via the liquid feed pipe. The manual valve is operated manually by a user of the mist blower to open and close the liquid feed pipe. In such a mist blower, when the user opens the manual valve and starts the engine, the liquid inside the tank is sucked towards a head aperture of the air feed pipe via the liquid feed pipe by the atmospheric pressure inside the tank and the negative pressure generated inside the air feed pipe, and the liquid is sprayed from the head aperture in atomized form.

SUMMARY

In the aforementioned mist blower, if the user fails to close the manual valve when the engine is stopped, the liquid may leak from the liquid feed pipe into the air feed pipe. In a case of a mist blower that carries an electric motor instead of an engine, if the user fails to close the manual valve when the electric motor is stopped, the liquid may leak from the liquid feed pipe into the air feed pipe.

Desirably, one aspect of the present disclosure is to provide a technique that can inhibit a leakage of a liquid from a liquid feed pipe into an air feed pipe of a mist blower at an inappropriate timing.

One aspect of the present disclosure provides a mist blower including an air blower, an air feed pipe, a tank, a liquid feed pipe, a nozzle, a first electromagnetic valve, a controller, and a first manual switch. The air blower (i) generates or increases an airflow in response to the air blower being activated and (ii) stops or decreases the airflow in response to the air blower being deactivated. The air feed pipe (i) has a first discharge port and (ii) guides the airflow from the air blower to the first discharge port. The tank holds a liquid therein. The liquid feed pipe (i) has an inflow port and an outflow port and (ii) guides the liquid from the inflow port to the outflow port. The inflow port is connected to the tank. The nozzle (i) has a second discharge port and (ii) is connected to the outflow port. The second discharge port is arranged in the air feed pipe so as to discharge the liquid in the liquid feed pipe into the air feed pipe by a negative pressure generated by the airflow flowing through the air feed pipe. The first electromagnetic valve opens the liquid feed pipe in response to the first electromagnetic valve being activated. The first electromagnetic valve closes the liquid feed pipe in response to the first electromagnetic valve being deactivated. The controller activates or deactivates the air blower and the first electromagnetic valve. The first manual switch is manually moved by a user of the mist blower. The first manual switch commands the controller to activate or deactivate the air blower based on a movement of the first manual switch.

In such a mist blower, the first electromagnetic valve is activated or deactivated by the controller, and accordingly, the liquid feed pipe is opened or closed by the controller. Therefore, this mist blower can inhibit, by the controller, a leakage of the liquid from the liquid feed pipe into the air feed pipe at an inappropriate timing.

BRIEF DESCRIPTION OF THE DRAWINGS

Example embodiments of the present disclosure will be described hereinafter with reference to the accompanying drawings, in which:

FIG. 13 is a table with liquid volume levels in association with respective opening levels of a first electromagnetic valve;

DETAILED DESCRIPTION OF EXEMPLARY EMBODIMENTS

1. Overview of Embodiments

Figure 1:
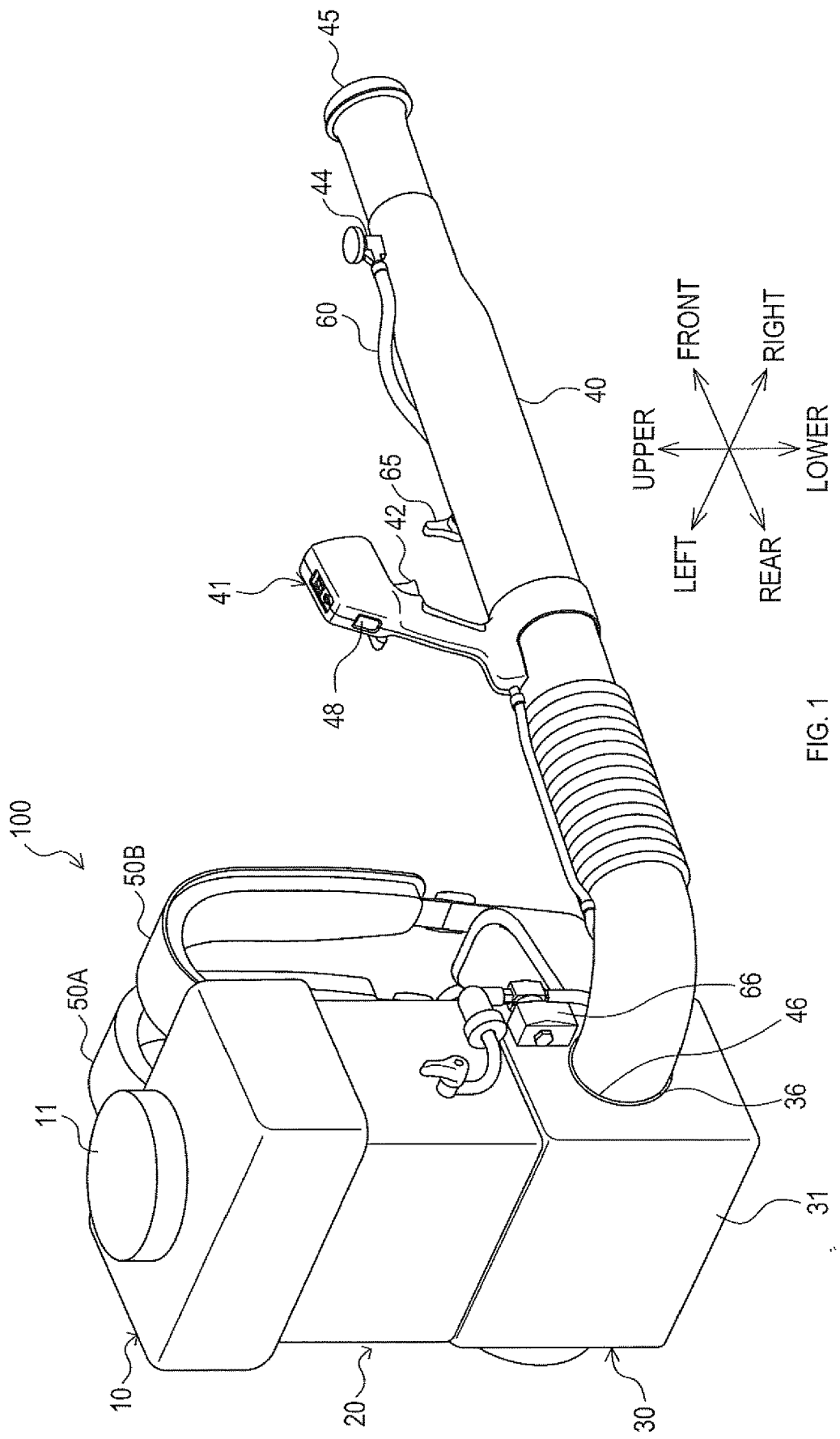
FIG. 1 is a perspective view schematically showing an outer view of a mist blower in a first embodiment.

One embodiment may provide a mist blower (or a spray or a sprayer or an atomizer) including at least any one of:
  Feature 1: an air blower configured (i) to generate or increase an airflow in response to the air blower being activated and (ii) to stop or decrease the airflow in response to the air blower being deactivated;
  Feature 2: an air feed pipe (i) having a first discharge port and (ii) configured to guide the airflow from the air blower to the first discharge port;
  Feature 3: a tank configured to hold a liquid therein;
  Feature 4: a liquid feed pipe (i) having an inflow port and an outflow port and (ii) configured to guide the liquid from the inflow port to the outflow port, the inflow port being connected to (or being in communication with) the tank;
  Feature 5: a nozzle (i) having a second discharge port and (ii) connected to the outflow port, the second discharge port being arranged in the air feed pipe so as to discharge the liquid in the liquid feed pipe into the air feed pipe by a negative pressure (or a low pressure or a decreased pressure) generated by the airflow flowing through the air feed pipe;
  Feature 6: a first electromagnetic valve configured (i) to open the liquid feed pipe in response to the first electromagnetic valve being activated and (ii) to close the liquid feed pipe in response to the first electromagnetic valve being deactivated;
  Feature 7: a controller configured to activate or deactivate the air blower and the first electromagnetic valve; and
  Feature 8: a first manual switch configured to be manually moved by a user of the mist blower, the first manual switch being configured to command the controller (or transmit a command to the controller) to activate or deactivate the air blower based on a movement of the first manual switch.

The mist blower including at least the features 1 through 8 can inhibit, by the controller, a leakage of the liquid from the liquid feed pipe into the air feed pipe at an inappropriate timing.

One embodiment may include, in addition to or in place of at least any one of the aforementioned features 1 through 8,
  Feature 9: the controller is configured (i) to activate the first electromagnetic valve in association with an activation of the air blower and (ii) to deactivate the first electromagnetic valve in association with a deactivation of the air blower.

In the mist blower including at least the features 1 through 9, the liquid feed pipe can be opened in association with the activation of the air blower and can be closed in association with the deactivation of the air blower.

One embodiment may include, in addition to or in place of at least any one of the aforementioned features 1 through 9, at least any one of:
  Feature 10: the first manual switch is configured to be manually moved between a first position and a second position by the user, the second position being distinct from the first position;
  Feature 11: the controller is configured to activate the air blower and the first electromagnetic valve based on the first manual switch being in the first position; and
  Feature 12: the controller is configured to deactivate the air blower and the first electromagnetic valve based on the first manual switch being in the second position.

In the mist blower including at least the features 1 through 12, the user can activate the air blower and the first electromagnetic valve by moving the first manual switch to the first position. The user can also deactivate the air blower and the first electromagnetic valve by moving the first manual switch to the second position.

One embodiment may include, in addition to or in place of at least any one of the aforementioned features 1 through 12, at least any one of:
  Feature 13: a flow speed sensor configured to measure a speed of the airflow flowing through the air feed pipe; and
  Feature 14: the controller is configured to activate the first electromagnetic valve based on (i) the air blower being activated and (ii) the speed of the airflow measured having reached a preset flow speed threshold.

In the mist blower including at least the features 1 through 8, 13, and 14, the liquid feed pipe is kept closed until the speed of the airflow flowing through the air feed pipe reaches the preset flow speed threshold. If the preset flow speed threshold is set to a speed at which the liquid can be sufficiently atomized (or turned into mist), it can be inhibited for the liquid to be leaked from the liquid feed pipe into the air feed pipe at an inappropriate timing when the liquid cannot be sufficiently atomized.

One embodiment may include, in addition to or in place of at least any one of the aforementioned features 1 through 14, at least any one of:
  Feature 15: the controller is configured to activate the first electromagnetic valve based on (i) the air blower being activated and (ii) an elapsed time having been advanced to a preset time threshold;
  Feature 16: the elapsed time is advanced based on the first manual switch commanding the controller to activate the air blower; and
  Feature 17: the elapsed time is initialized based on the first manual switch commanding the controller to deactivate the air blower.

In the mist blower including at least the features 1 through 8, and 15 through 17, the liquid feed pipe is kept closed until the elapsed time is advanced to the preset time threshold. If the preset time threshold is set to a time required for the airflow to reach the speed to sufficiently atomize the liquid since the initiation of the activation of the air blower, it is possible to inhibit the leakage of the liquid from the liquid feed pipe into the air feed pipe at an inappropriate timing when the liquid cannot be sufficiently atomized.

One embodiment may include, in addition to or in place of at least any one of the aforementioned features 1 through 17, at least any one of:
  Feature 18: the controller is configured to activate the air blower based on the first manual switch being in the first position;
  Feature 19: the elapsed time is advanced based on the first manual switch being in the first position; and
  Feature 20: the elapsed time is initialized based on the first manual switch being in the second position.

In the mist blower including at least the features 1 through 8, 10, and 15 through 20, the liquid feed pipe can be automatically opened in response to (i) the user having manually activated the air blower via the first manual switch and (ii) the elapsed time having been advanced to the One embodiment may include, in addition to or in place of at least any one of the aforementioned features 1 through 20, at least any one of:

Feature 21: the controller is configured to detect that the controller is in a fault condition; and Feature 22: the controller is configured to deactivate the first electromagnetic valve based on the controller detecting that the controller is in the fault condition.

In the mist blower including at least the features 1 through 8, 21, and 22, the liquid feed pipe can be automatically closed when the controller is in the fault condition. Accordingly, it is possible to inhibit the leakage of the liquid from the liquid feed pipe into the air feed pipe at an inappropriate timing when the controller is in the fault condition.

One embodiment may include, in addition to or in place of at least any one of the aforementioned features 1 through 22, Feature 23: the controller is configured to, in response to the controller detecting that the controller is in the fault condition, keep deactivating the first electromagnetic valve until the first manual switch is moved from the first position to the second position and to the first position again.

In the mist blower including at least the features 1 through 8, 10 through 12, and 21 through 23, the liquid feed pipe can be kept closed when the controller is in the fault condition until the first manual switch is moved from the first position to the second position and to the first position again.

One embodiment may include, in addition to or in place of at least any one of the aforementioned features 1 through 23, at least any one of:

Feature 24: a second manual switch (i) configured to be manually moved by the user and (ii) distinct from the first manual switch;

Feature 25: the second manual switch is configured to designate a volume of the liquid to be discharged from the second discharge port based on a movement of the second manual switch; and Feature 26: the controller is configured to control an opening level of the first electromagnetic valve based on the volume of the liquid designated by the second manual switch.

In the mist blower including at least the features 1 through 8, and 24 through 26, the user can adjust the volume of the liquid to be sprayed via the second manual switch.

One embodiment may include, in addition to or in place of at least any one of the aforementioned features 1 through 26, Feature 27: a flow rate sensor configured to measure a flow rate of the liquid flowing through the liquid feed pipe.

The mist blower including at least the features 1 through 8, and 27 can measure the flow rate of the liquid flowing through the liquid feed pipe.

One embodiment may include, in addition to or in place of at least any one of the aforementioned features 1 through 27, Feature 28: a second electromagnetic valve configured (i) to open the liquid feed pipe in response to the second electromagnetic valve being activated and (ii) to close the liquid feed pipe in response to the second electromagnetic valve being deactivated.

The mist blower including at least the features 1 through 8, and 28 can close the liquid feed pipe by the second electromagnetic valve even when the first electromagnetic valve has a fault.

One embodiment may include, in addition to or in place of at least any one of the aforementioned features 1 through 28, Feature 29: the controller is configured to deactivate the second electromagnetic valve based on (i) the first manual switch being in the second position and (ii) the flow rate measured being greater than or equal to a first preset flow rate threshold.

In the mist blower including at least the features 1 through 8, 10 through 12, and 27 through 29, the controller can close the liquid feed pipe by deactivating the second electromagnetic valve when the first electromagnetic valve has a fault and the controller therefore cannot deactivate the first electromagnetic valve, resulting in the liquid flowing through the liquid feed pipe at the flow rate greater than or equal to the first preset flow rate threshold.

One embodiment may include, in addition to or in place of at least any one of the aforementioned features 1 through 29, Feature 30: the controller is configured to deactivate the first electromagnetic valve and/or the second electromagnetic valve based on (i) the first manual switch being in the first position and (ii) the flow rate measured being less than a second preset flow rate threshold.

In the mist blower including at least the features 1 through 8, 10 through 12, 27, 28, and 30, the controller can close the liquid feed pipe by deactivating the first electromagnetic valve and/or the second electromagnetic valve when the first electromagnetic valve has a fault and the liquid feed pipe is therefore insufficiently opened, resulting in the liquid flowing through the liquid feed pipe at the flow rate less than the second preset flow rate threshold.

One embodiment may include, in addition to or in place of at least any one of the aforementioned features 1 through 30, Feature 31: a mechanical valve configured to be manually operated by the user to thereby open or close the liquid feed pipe.

In the mist blower including at least the features 1 through 8, and 31, the user can manually open or close the liquid feed pipe via the mechanical valve. The leakage of the liquid from the liquid feed pipe into the air feed pipe can be inhibited when the liquid feed pipe is closed by the mechanical valve even in a case where the mist blower is turned laterally or upside down.

One embodiment may include, in addition to or in place of at least any one of the aforementioned features 1 through 31, at least any one of:

Feature 32: the liquid feed pipe is provided with the first electromagnetic valve and the mechanical valve; and Feature 33: the mechanical valve is arranged so as to receive the liquid having passed the first electromagnetic valve.

In the mist blower including at least the features 1 through 8, and 31 through 33, the user can manually close the liquid feed pipe via the mechanical valve even when the first electromagnetic valve has a fault and is unable to close the liquid feed pipe.

One embodiment may include, in addition to or in place of at least any one of the aforementioned features 1 through 33, Feature 34: the first electromagnetic valve is arranged so as to receive the liquid having passed the mechanical valve.

In the mist blower including at least the features 1 through 8, 31, 32, and 34, the user can manually close the liquid feed pipe via the mechanical valve even when the first electromagnetic valve has a fault and is unable to close the liquid feed pipe.

One embodiment may include, in addition to or in place of at least any one of the aforementioned features 1 through 34, at least any one of:

Feature 35: the air blower includes an impeller configured to be rotated to thereby generate the airflow;

Feature 36: the air blower includes an electric motor configured to rotate the impeller; and Feature 37: the controller is configured to (i) activate the electric motor to thereby activate the air blower and (ii) to deactivate the electric motor to thereby deactivate the air blower.

In the mist blower including at least the features 1 through 8, and 35 through 37, the airflow can be generated by rotating the impeller by the electric motor.

In the mist blower including at least the features 1 through 9, and 35 through 37, the liquid feed pipe can (i) be opened in association with the activation of the electric motor and (ii) be closed in association with the deactivation of the electric motor.

One embodiment may include, in addition to or in place of at least any one of the aforementioned features 1 through 37, at least any one of:

Feature 38: a connector configured to be connected to a battery;

Feature 39: the first electromagnetic valve includes a solenoid;

Feature 40: the controller is configured to receive an electric power from the battery connected to the connector;

Feature 41: the controller is configured to respectively deliver a first drive current and a second drive current to the electric motor and the solenoid to thereby respectively activate the electric motor and the first electromagnetic valve; and Feature 42: the controller is configured to respectively interrupt the first drive current and the second drive current to thereby respectively deactivate the electric motor and the first electromagnetic valve.

In the mist blower including at least the features 1 through 8, and 35 through 42, the electric motor and the first electromagnetic valve can be activated or deactivated by respectively delivering the first drive current and the second drive current to the electric motor and the first electromagnetic valve or by respectively interrupting the first drive current and the second drive current.

One embodiment may include, in addition to or in place of at least any one of the aforementioned features 1 through 42, Feature 43: the controller is configured to activate the first electromagnetic valve based on an actual rotational frequency of the electric motor having reached a first preset rotational frequency threshold.

In the mist blower including at least the features 1 through 8, 35 through 37, and 43, the liquid feed pipe is kept closed until the actual rotational frequency of the electric motor reaches the first preset rotational frequency threshold. If the first preset rotational frequency threshold is set to a rotational frequency of the electric motor required to generate the airflow that sufficiently atomizes the liquid, it is possible to inhibit the leakage of the liquid from the liquid feed pipe into the air feed pipe at an inappropriate timing when the liquid cannot be sufficiently atomized.

One embodiment may include, in addition to or in place of at least any one of the aforementioned features 1 through 43, at least any one of:

Feature 44: a rotational position sensor configured to detect a rotational position of the electric motor; and Feature 45: the controller is configured to measure the actual rotational frequency of the electric motor based on the rotational position detected.

The mist blower including at least the features 1 through 8, 35 through 37, and 43 through 45 can measure the actual rotational frequency of the electric motor based on the rotational position of the electric motor.

One embodiment may include, in addition to or in place of at least any one of the aforementioned features 1 through 45, at least any one of:

Feature 46: the air blower includes an internal combustion engine including a shaft, the internal combustion engine being configured to combust a fuel to thereby rotate the shaft, and the shaft being connected to the impeller;

Feature 47: the controller is configured to increase an actual rotational frequency of the internal combustion engine to thereby activate the air blower; and Feature 48: the controller is configured to decrease the actual rotational frequency of the internal combustion engine to thereby deactivate the air blower.

In the mist blower including at least the features 1 through 8, 35, and 46 through 48, the airflow can be generated by rotating the impeller by the internal combustion engine.

In the mist blower including at least the features 1 through 9, 35, and 46 through 48, the liquid feed pipe can (i) be opened in association with the actual rotational frequency of the internal combustion engine increasing and (ii) be closed in association with the actual rotational frequency of the internal combustion engine decreasing.

One embodiment may include, in addition to or in place of at least any one of the aforementioned features 1 through 48, Feature 49: the controller is configured to activate the first electromagnetic valve based on the actual rotational frequency of the internal combustion engine having reached a second preset rotational frequency threshold.

In the mist blower including at least the features 1 through 8, 35, and 46 through 49, the liquid feed pipe is kept closed until the actual rotational frequency of the internal combustion engine reaches the second preset rotational frequency threshold. If the second preset rotational frequency threshold is set to a rotational frequency of the internal combustion engine required to generate the airflow that sufficiently atomizes the liquid, it is possible to inhibit the leakage of the liquid from the liquid feed pipe into the air feed pipe at an inappropriate timing when the liquid cannot be sufficiently atomized One embodiment may include, in addition to or in place of at least any one of the aforementioned features 1 through 49, at least any one of:

Feature 50: a first electric generator configured to generate a first electric power based on a rotation of the shaft; and Feature 51: the controller is configured to measure the actual rotational frequency of the internal combustion engine based on the first electric power generated.

The mist blower including at least the features 1 through 8, 35, and 46 through 51 can measure the actual rotational frequency of the internal combustion engine based on the first electric power.

One embodiment may include, in addition to or in place of at least any one of the aforementioned features 1 through 51, at least any one of:

Feature 52: a second electric generator configured to generate a second electric power based on a rotation of the shaft; and Feature 53: the first electromagnetic valve is configured to receive the second electric power generated.

In the mist blower including at least the features 1 through 8, 35, 46 through 48, 52, and 53, the first electromagnetic valve can be activated by the second electric power generated based on the rotation of the shaft.

One embodiment may include, in addition to or in place of at least any one of the aforementioned features 1 through 53, Feature 54: the second discharge port is arranged inside the air feed pipe.

One embodiment may include, in addition to or in place of at least any one of the aforementioned features 1 through 54, at least any one of:

Feature 55: the nozzle has an outer shape gradually narrower towards the second discharge port; and Feature 56: the nozzle is arranged inside the air feed pipe so as to direct the second discharge port to a downstream of the airflow.

In the mist blower including at least the features 1 through 8, and 54 through 56, the aforementioned outer shape and arrangement of the nozzle causes the airflow around the second discharge port to accelerate, which causes an enhanced Bernoulli Effect at the second discharge port. As a consequence, the liquid in the liquid feed pipe can be effectively or efficiently discharged into the air feed pipe.

In one embodiment, the features 1 through 56 may be in any combination.

In one embodiment, any of the features 1 through 56 may be omitted.

In one embodiment, the controller may be integrated into a single electronic unit, a single electronic device, or a single circuit board.

In one embodiment, the controller may include a combination of two or more electronic circuits, two or more electronic units, or two or more electronic devices separately disposed on or in the mist blower.

In one embodiment, the controller may include a microcomputer, a microprocessor, a microcontroller unit, a wired logic, an application-specific integrated circuit (ASIC), an application-specific standard product (ASSP), a programmable logic device (such as a Field Programmable Gate Array (FPGA)), a discrete electronic component, and/or a combination of the above.

Examples of the first manual switch and the second manual switch include a trigger switch, a push-button switch, a dial switch, a slide switch, a tactile switch, a joystick, a touch panel, a touch screen, and a Graphical User Interface (GUI). With respect to the touch panel, the touch screen, and the GUI, the first position and the second position may indicate locations on the touch panel, the tough screen, and the GUI.

2. Specific Example Embodiments

Hereinafter, specific example embodiments will be explained. These specific example embodiments are merely examples, and the present disclosure can be implemented in any form without being limited to these embodiments.

2-1. First Embodiment

2-1-1. Mechanical Structure

Figure 2:
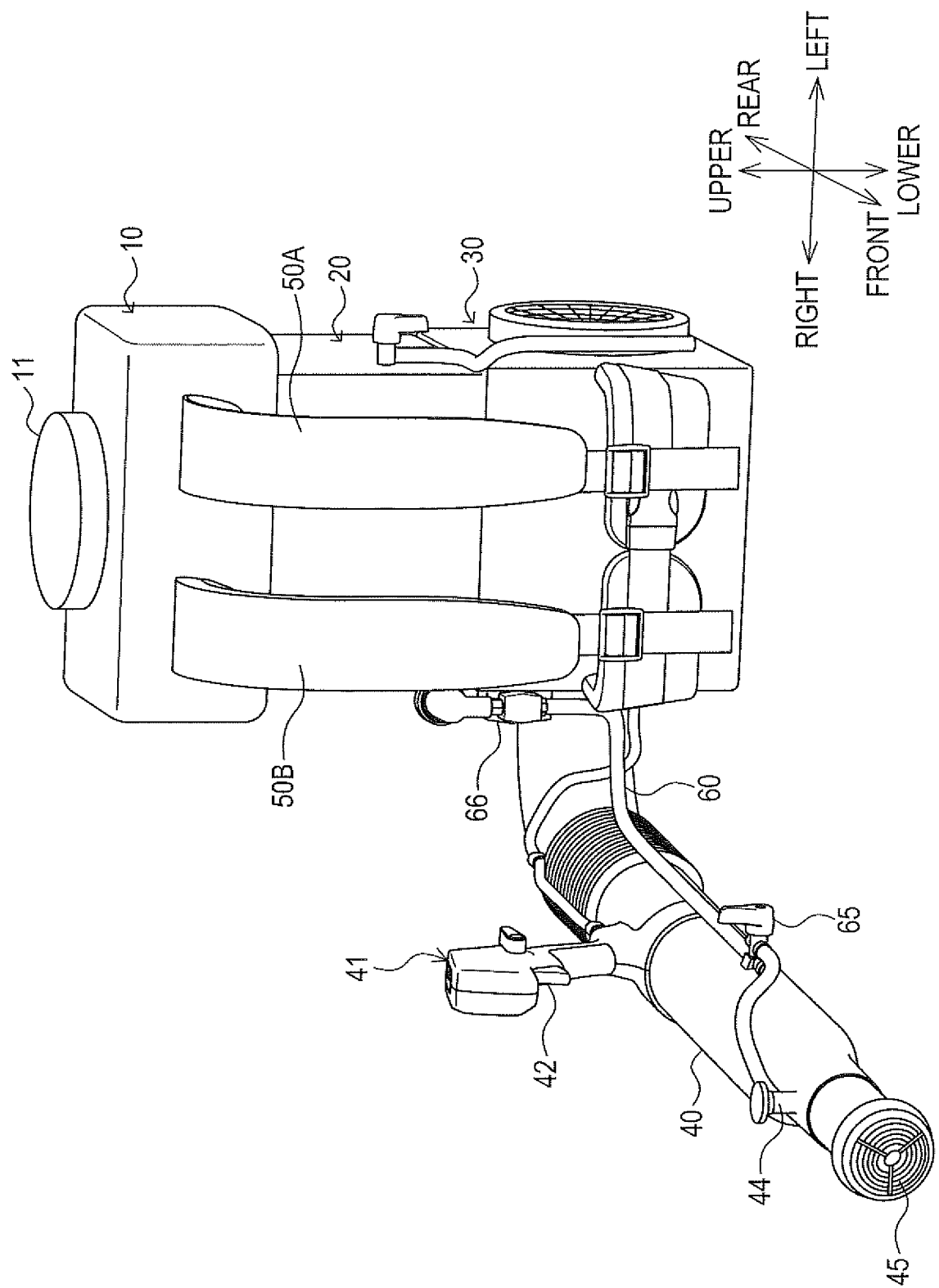
FIG. 2 is a front view schematically showing the outer view of the mist blower in the first embodiment.

FIGS. 1 and 2 show overall structures of a mist blower 100 in the present first embodiment. The mist blower 100 is a work machine configured to spray an atomized liquid. The liquid to be atomized and sprayed in the present first embodiment is a solution, such as a liquid chemical. Examples of the liquid chemical include an agricultural chemical. Examples of the agricultural chemical include a plant growth regulator, a herbicide, and a pesticide. The mist blower 100 may be used to spray the liquid chemical in an orchard. The liquid in other embodiments may be any other liquid, such as a liquid fertilizer and water.

The mist blower 100 includes a tank 10. The tank 10 contains the liquid to be atomized and sprayed. The tank 10 in the present first embodiment is, but not limited to, approximately rectangular solid in shape. The tank 10 includes a not-shown opening on its upper surface for supplying the liquid. The tank 10 includes a detachable lid 11 that closes the opening.

The mist blower 100 includes a container 20 under the tank 10. In the present first embodiment, the container 20 is, but is not limited to, approximately rectangular solid in shape.

The mist blower 100 includes an air blower 30 under the container 20, The air blower 30 includes a housing 31. In the present first embodiment, the housing 31 is, but is not limited to, approximately rectangular solid in shape. The housing 31 has a right-side surface having an air outlet 36. The air outlet 36 discharges an airflow.

The mist blower 100 includes an air feed pipe (or an air feed conduit) 40 attached to the air outlet 36. The air feed pipe 40 has a cylindrical shape that is bent forward and extended from the air outlet 36 towards the front of the mist blower 100. The air feed pipe 40 includes a first end that has a first discharge port 45. The air feed pipe 40 includes a second end that has a connection aperture 46. The connection aperture 46 is coupled to the air outlet 36 to communicate with the air blower 30.

The air feed pipe 40 includes a grip 41 that is slidably attached to an outer surface of the air feed pipe 40. The grip 41 is formed to be gripped with one hand (right hand in the present first embodiment) of a user of the mist blower 100. The grip 41 includes an airflow adjustment panel 48 on its rear side. The airflow adjustment panel 48 includes a not-shown adjustment switch, and a not-shown display. The adjustment switch is manually operated by the user to select a flow speed of an air discharged from the air feed pipe 40. The adjustment switch in the present first embodiment is configured to be moved between two or more positions. These two or more positions are associated with different flow speeds. Examples of the adjustment switch include a push-button switch, a slide switch, and a dial switch. In the mist blower 100 in the present first embodiment, the flow speed of the air is increased or decreased in stages in response to the movement of the adjustment switch. The display is configured to indicate the flow speed selected. The display in the present first embodiment includes one or more light-emitting diodes (LED). In the present first embodiment, the user can set the flow speed of the air discharged from the air feed pipe 40 in three stages through the airflow adjustment panel 48. In other embodiments, the flow speed of the air discharged from the air feed pipe 40 may be set in two stages or four or more stages.

A first manual switch 42 is disposed on a front side of the grip 41. The first manual switch 42 in the present first embodiment is in the form of a trigger switch. In other embodiments, the first manual switch 42 may be in any form other than the trigger switch, such as a push-button switch, a dial switch, a slide switch, a joy stick, a touch panel, a touch screen, and a GUI. The first manual switch 42 is configured to be pulled (or moved) to an ON position by the user in order to discharge the atomized liquid from the air feed pipe 40. The ON position corresponds to one example of the first position in the overview of embodiments. The ON position in the present first embodiment corresponds to a position where the first manual switch 42 is pulled to the maximum. The first manual switch 42 is configured to move back to an OFF position in response to having been released by the user in order to stop discharging the atomized liquid from the air feed pipe 40. The OFF position corresponds to one example of the second position in the overview of embodiments. The OFF position in the present first embodiment corresponds to a position where the first manual switch 42 is not pulled by the user.

The mist blower 100 includes a liquid feed pipe (or a liquid feed conduit) 60 extending along the air feed pipe 40. The liquid feed pipe 60 has a thin cylindrical shape.

The mist blower 100 includes a liquid volume adjuster 44 disposed on the liquid feed pipe 60.

The liquid volume adjuster 44 is a mechanical valve. In other words, the liquid volume adjuster 44 is configured such that its opening level is manually operated by the user. The liquid volume adjuster 44 in the present first embodiment is configured to be turned by the user to vary its opening level. By adjusting the opening level of the liquid volume adjuster 44, the user can adjust the volume of the liquid supplied to the air feed pipe 40, and thus the volume of the liquid sprayed from the mist blower 100. When the mist blower 100 is not used or is stored, the user closes the liquid volume adjuster 44 to block the liquid from entering the air feed pipe 40 from the liquid feed pipe 60.

The mist blower 100 includes a first electromagnetic valve 66 provided with the liquid feed pipe 60. The first electromagnetic valve 66 opens or closes the liquid feed pipe 60. The first electromagnetic valve 66 opens the liquid feed pipe 60 when activated, and closes the liquid feed pipe 60 when deactivated.

The mist blower 100 includes a mechanical valve 65 provided with the liquid feed pipe 60. The mechanical valve 65 is configured to be manually operated by the user to completely open or completely close the liquid feed pipe 60. In the present first embodiment, the mechanical valve 65 is situated upstream of the liquid feed pipe 60 relative to the liquid volume adjuster 44 and downstream of the liquid feed pipe 60 relative to the first electromagnetic valve 66. Accordingly, the mechanical valve 65 is arranged so as to receive the liquid having passed the first electromagnetic valve 66.

By closing the mechanical valve 65, a leakage of the liquid from the liquid feed pipe 60 into the air feed pipe 40 can be inhibited even in a case where the mist blower 100 is turned laterally or upside down. In addition, the user can manually close the liquid feed pipe 60 with the mechanical valve 65 even when the first electromagnetic valve 66 has a fault and is unable to close the liquid feed pipe 60.

In other embodiments, the mechanical valve 65 may be excluded from the mist blower 100.

In other embodiments, the liquid volume adjuster 44 may be excluded from the mist blower 100. In addition, the mechanical valve 65 and/or the first electromagnetic valve 66 may be configured to enable fine adjustment of each opening level. In this case, the volume of the liquid to be fed to the air feed pipe 40 can still be adjusted while reducing the components of the mist blower 100 due to the exclusion of the liquid volume adjuster 44.

On its front side, the mist blower 100 includes first and second shoulder straps 50A and 50B. Upper ends of the first and second shoulder straps 50A and 50B are attached to a front surface of the tank 10. Lower ends of the first and second shoulder straps 50A and 50B are attached to a front surface of the housing 31. The user can carry the mist blower 100 on his/her back by placing the first and second shoulder straps 50A and 50B on his/her shoulders.

Figure 3:
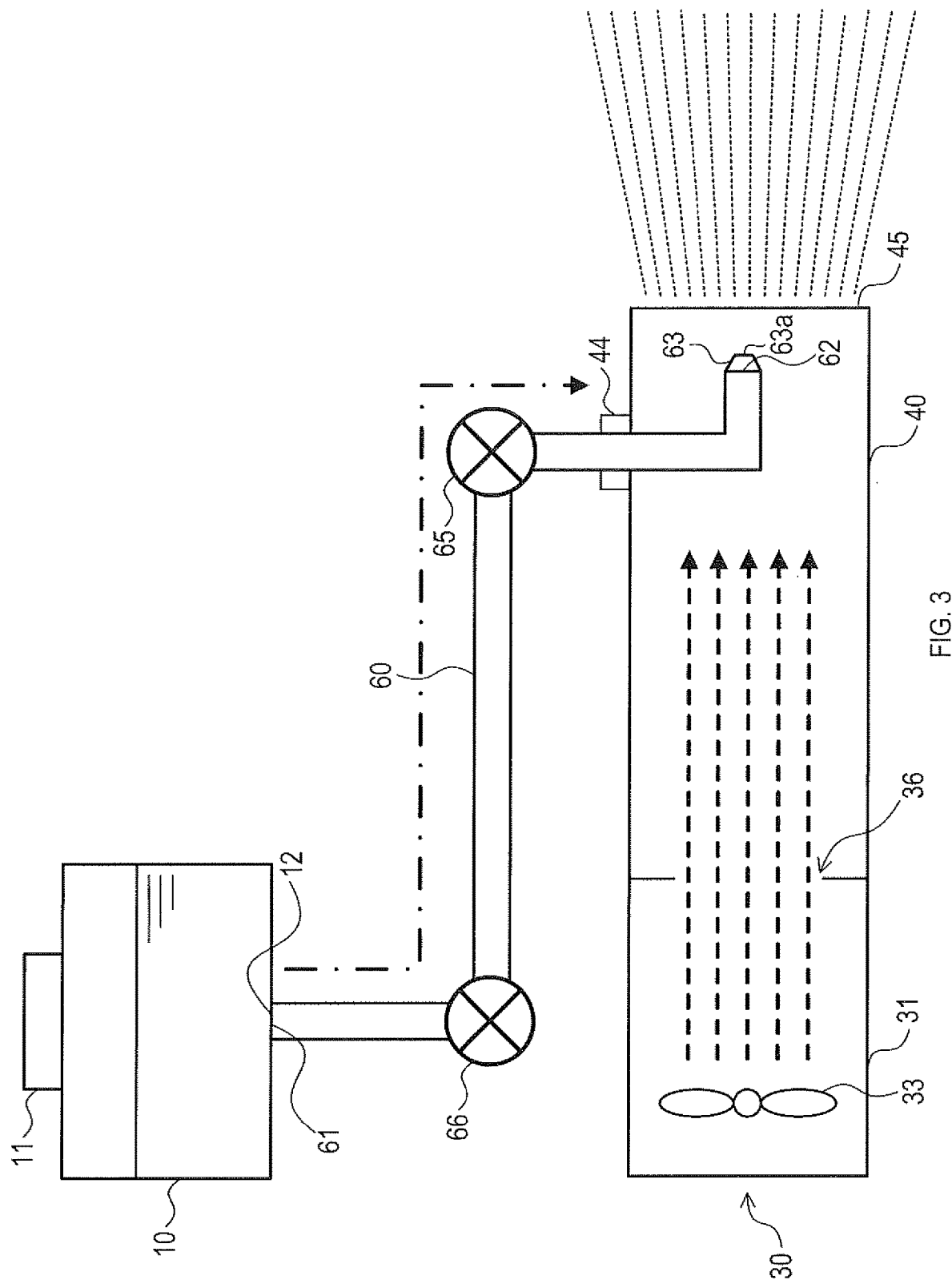
FIG. 3 is a schematic drawing showing an air passage and a liquid passage of the mist blower in the first embodiment.

As shown in FIG. 3, the air blower 30 includes an impeller 33 housed in the housing 31. The impeller 33 is configured to rotate and generate the airflow directed to the air outlet 36. Examples of the impeller 33 include an axial-flow fan, a centrifugal fan, a mixed flow fan, a closed fan, and a sirocco fan.

The tank 10 includes a discharge aperture 12 for discharging the liquid contained in the tank 10 at the bottom of the tank 10. The liquid feed pipe 60 includes a first end having an inflow port 61 and coupled to the discharge aperture 12. The liquid feed pipe 60 is inserted into the air feed pipe 40 and fixed to the air feed pipe 40 via the liquid volume adjuster 44 near a front end of the air feed pipe 40. The liquid feed pipe 60 includes a second end having an outflow port 62 and disposed downstream of the impeller 33 inside the air feed pipe 40. The outflow port 62 is coupled to a nozzle 63. The nozzle 63 includes a second discharge port 63a at a front end of the nozzle 63. The second discharge port 63a has a diameter that is sufficiently smaller than the diameter of the air feed pipe 40. The nozzle 63 has an outer shape gradually narrower towards the second discharge port 63a. The nozzle 63 is arranged inside the air feed pipe 40 so as to direct the second discharge port 63a to a downstream of the airflow. In other embodiments, the nozzle 63 may be arranged at any part of the air feed pipe 40 other than the inside of the air feed pipe 40, such as a wall of the air feed pipe 40 so as to direct the second discharge port 63a to the airflow.

The liquid contained in the tank 10 is under the atmospheric pressure. The atmospheric pressure acts on the liquid such that the liquid is fed from the discharge aperture 12 to the air feed pipe 40.

Inside the air feed pipe 40, the airflow generated by the impeller 33 causes a negative pressure at the second discharge port 63a of the nozzle 63. This negative pressure acts on the liquid inside the liquid feed pipe 60 such that the liquid inside the liquid feed pipe 60 is drawn out from the second discharge port 63a. The negative pressure increases as the rotational frequency of the impeller 33 increases, which causes the liquid inside the liquid feed pipe 60 to be ejected out from the second discharge port 63a. The ejected liquid is atomized by the airflow inside the air feed pipe 40 and sprayed from the first discharge port 45 of the air feed pipe 40.

2-1-2. Electrical Configuration

Figure 4:
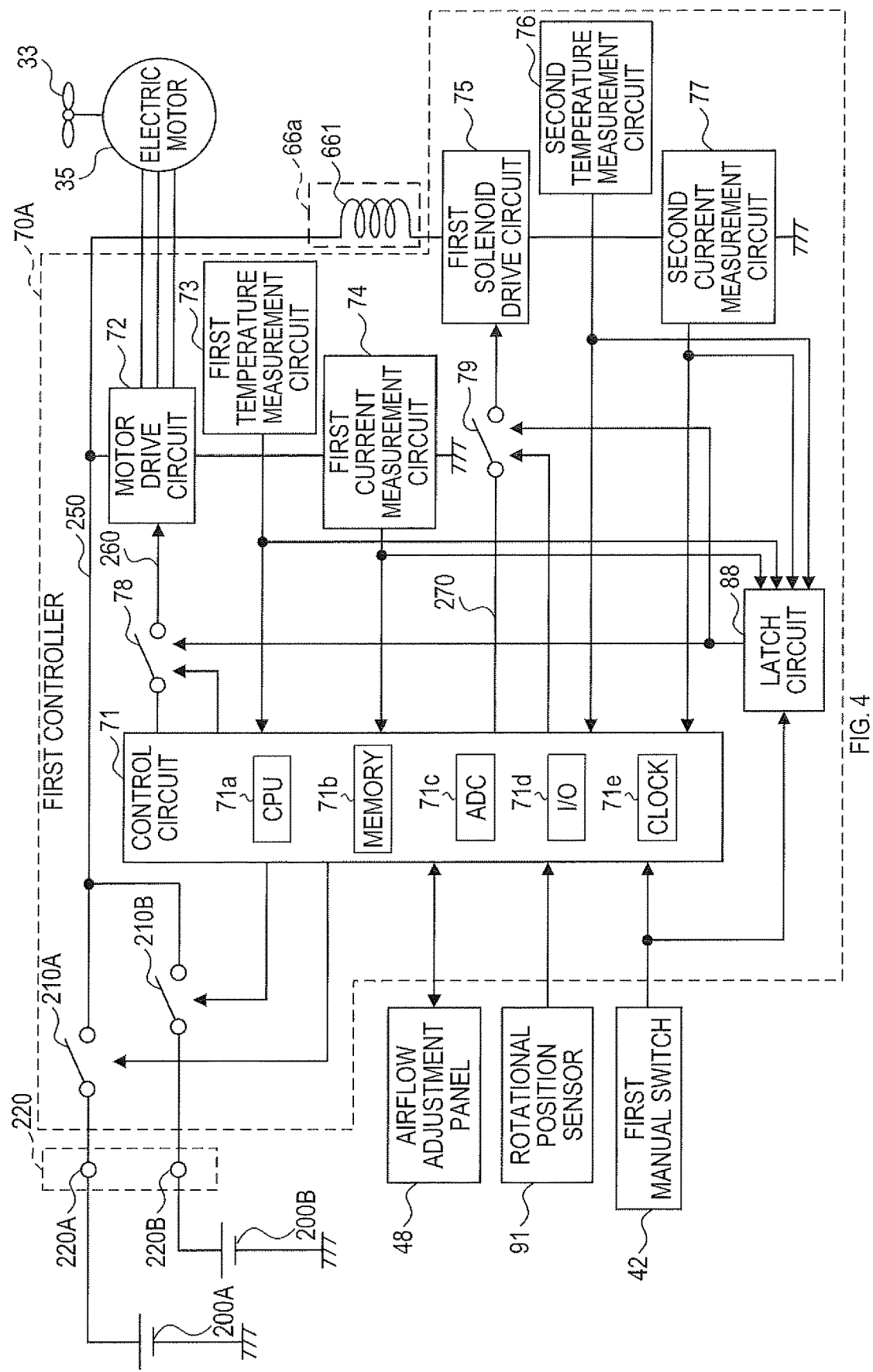
FIG. 4 is a block diagram showing an electrical configuration of the mist blower in the first embodiment.

An electrical configuration of the mist blower 100 will be explained with reference to FIG. 4.

The mist blower 100 includes an electric motor 35. The electric motor 35 rotates the impeller 33, In the present first embodiment, the electric motor 35 is housed inside the housing 31 of the air blower 30. In the present first embodiment, the electric motor 35 is in the form of a three-phase brushless DC motor. In other embodiments, the electric motor 35 may be in any other form including a single-phase brushless DC motor, a two-phase brushless DC motor, a brushless DC motor with four or more phases, a brushed DC motor, and an AC motor.

The mist blower 100 includes a rotational position sensor 91. In the present first embodiment, the rotational position sensor 91 is housed in the housing 31 of the air blower 30 with the electric motor 35 or attached to the electric motor 35. The rotational position sensor 91 detects a rotational position of a not-shown rotor of the electric motor 35 and outputs one or more rotational position signals. The one or more rotational position signals vary depending on the detected rotational position of the rotor. Examples of the rotational position sensor 91 include a Hall sensor.

In the ON position, the first manual switch 42 disposed on the grip 41 outputs an activation command signal for commanding (i) an activation of the electric motor 35, and (ii) an activation of the first electromagnetic valve 66. In the OFF position, the first manual switch 42 outputs a deactivation command signal for commanding (i) a deactivation of the electric motor 35, and (ii) a deactivation of the first electromagnetic valve 66. The first manual switch 42 in the present first embodiment outputs a manual operation signal that serves as the activation command signal and the deactivation command signal. The manual operation signal is in the form of a binary logic signal. The manual operation signal having a logic HIGH corresponds to the activation command signal; the manual operation signal having a logic LOW corresponds to the deactivation command signal. In other embodiments, the manual operation signal having the logic HIGH may correspond to the deactivation command signal; the manual operation signal having the logic LOW may correspond to the activation command signal. Alternatively, in other embodiments, the mist blower 100 may include a path for transmitting the activation command signal and a path for transmitting the deactivation command signal in parallel, and the first manual switch 42 may output the activation command signal and the deactivation command signal separately via these paths.

The mist blower 100 includes a first battery 200A and a second battery 200B. In the present first embodiment, the first battery 200A and the second battery 200B have the same rated voltage. In other embodiments, the first battery 200A may have a rated voltage different from that of the second battery 200B. In the present first embodiment, each of the first battery 200A and the second battery 200B includes a lithium-ion battery. In other embodiments, the first battery 200A and/or the second battery 200B may include any other form of a primary battery (or a non-rechargeable battery) or a secondary battery (or a rechargeable battery) other than the lithium-ion battery. In the present first embodiment, the first battery 200A and the second battery 200B are housed in the container 20. In other embodiments, the first battery 200A and/or the second battery 200B may be disposed at any part of the mist blower 100 other than in the container 20.

In the present first embodiment, the first battery 200A is configured to determine whether the first battery 200A can discharge an electric power; and the second battery 200B is configured to determine whether the second battery 200E can discharge an electric power. The first battery 200A and the second battery 200B are configured to output a not-shown power discharge permission signal when they are able to discharge the respective electric powers. The first battery 200A and the second battery 200B are configured to output a not-shown power discharge prohibition signal when they are not able to discharge the respective electric powers.

The mist blower 100 includes a connector 220. In the present first embodiment, the connector 220 is also housed in the container 20. In other embodiments, the connector 220 may be disposed at any part of the mist blower 100 other than in the container 20. The connector 220 includes one or more connection port. In the present first embodiment, the connector 220 includes a first connection port 220A and a second connection port 220B. The first connection port 220A and the second connection port 220B are respectively coupled to the first battery 200A and the second battery 200B, The mist blower 100 includes a first controller 70A. In the present first embodiment, the first controller 70A is housed in the container 20. In other embodiments, the first controller 70A may be disposed at any part of the mist blower 100 other than in the container 20.

The first controller 70A includes a control circuit 71. The control circuit 71 in the present first embodiment is in the form of a microcomputer (or a microprocessor, or a microcontroller unit) including a CPU 71a, a memory 71b, an analog-to-digital converter (ADC) 71c, an input/output (I/O) port 71d, and a clock generator 71e. The control circuit 71 in the present first embodiment achieves various functions of the control circuit 71 by the CPU 71a executing various programs stored in the memory 71b. The ADC 71c converts two or more analog signals received by the control circuit 71 into respective digital values. The clock generator 71e generates a clock signal oscillating at a constant frequency.

In other embodiments, the control circuit 71 may include, in place of or in addition to the microcomputer, a wired logic, an ASIC, an ASSP, a programmable logic device (such as an FPGA), a discrete electronic component, and/or a combination of these.

The first controller 70A includes a latch circuit 88 including a wired logic. The latch circuit 88 is configured to enable or disable the control circuit 71 to activate the electric motor 35 and the first electromagnetic valve 66 based on the condition (or the state) of the first controller 70A.

The first controller 70A includes a first battery switch 210A and a second battery switch 210B. The first battery switch 210A and the second battery switch 210B are turned on or turned off by the control circuit 71. Each of the first battery switch 210A and the second battery switch 210B includes a first terminal coupled to the first connection port 220A or the second connection port 220B. The first controller 70A includes a power-supply line 250 that is to be electrically connected to a positive electrode of the first battery 200A or to a positive electrode of the second battery 200B. Each of the first battery switch 210A and the second battery switch 210B includes a second terminal coupled to the power-supply line 250. In the present first embodiment, the first battery switch 210A and the second battery switch 210B are in the form of a semiconductor switch (such as a field effect transistor (FET)), a solid-state relay (SSR), or a mechanical relay.

The first controller 70A includes a motor drive circuit 72. The motor drive circuit 72 is coupled to the power-supply line 250 and to the electric motor 35. The motor drive circuit 72 receives the electric power from the first battery 200A or the second battery 200B via the power-supply line 250 and delivers a first drive current to the electric motor 35. The motor drive circuit 72 in the present first embodiment includes a not-shown three-phase full bridge circuit including three high-side switches and three low-side switches. These switches in the three-phase full bridge circuit is controlled by the control circuit 71. In other embodiments, the motor drive circuit 72 may include, in place of the three-phase full bridge circuit, another bridge circuit in any form (such as a half-bridge circuit) other than the three-phase full bridge circuit. Alternatively, in other embodiments, the motor drive circuit 72 may include, in place of the three-phase full bridge circuit, an inverter circuit that converts a DC power into an AC power. Alternatively, in other embodiments, the motor drive circuit 72 may include, in place of the three-phase full bridge circuit, a semiconductor switch in any form including an FET, a bipolar transistor, an insulated-gate bipolar transistor (IGBT), and an SSR.

The first controller 70A includes a first temperature measurement circuit 73 disposed in the vicinity of the motor drive circuit 72. The first temperature measurement circuit 73 measures a temperature of the motor drive circuit 72 (hereinafter referred to as a first temperature T1) and outputs a first temperature signal. In the present first embodiment, the first temperature measurement circuit 73 includes a not-shown thermistor. The first temperature signal has a voltage that varies in accordance with the measured first temperature T1.

The first controller 70A includes a first current measurement circuit 74. The first current measurement circuit 74 measures a value of the first drive current flowing through the electric motor 35 and the motor drive circuit 72 (hereinafter referred to as first current value I1) and outputs a first current signal. In the present first embodiment, the first current measurement circuit 74 includes a not-shown shunt resistor. The first current signal has a voltage that varies in accordance with the measured first current value I1.

The first controller 70A includes a first signal line 260 that electrically couples the control circuit 71 to the motor drive circuit 72. The first controller 70A includes a first enabling switch 78 on the first signal line 260. The first enabling switch 78 is controlled by the control circuit 71 and the latch circuit 88. In the present first embodiment, the first enabling switch 78 is in the form of a semiconductor switch (such as an PET), an SSR, or a mechanical relay.

The first controller 70A includes a first solenoid drive circuit 75. The first solenoid drive circuit 75 drives a first solenoid 66a disposed in the first electromagnetic valve 66. The first solenoid 66a includes a first excitation coil 661, and a not-shown first plunger (specifically, an iron piece). The first excitation coil 661 has a first end coupled to the power-supply line 250. The first excitation coil 661 has a second end coupled to the first solenoid drive circuit 75. The first solenoid drive circuit 75 conducts or interrupts a second drive current from the power-supply line 250 to the first excitation coil 661. As the second drive current flows through the first excitation coil 661, the first excitation coil 661 is magnetized (or excited) and attracts the first plunger, which consequently causes the first electromagnetic valve 66 to open. When the second drive current is interrupted, the first excitation coil 661 is demagnetized (or de-excited) and releases the first plunger, which consequently causes the first electromagnetic valve 66 to close.

The first controller 70A includes a second temperature measurement circuit 76 disposed in the vicinity of the first solenoid drive circuit 75. The second temperature measurement circuit 76 measures a temperature of the first solenoid drive circuit 75 (hereinafter referred to as a second temperature T2) and outputs a second temperature signal. In the present first embodiment, the second temperature measurement circuit 76 includes a not-shown thermistor. The second temperature signal has a voltage that varies in accordance with the measured second temperature T2.

The first controller 70A includes a second current measurement circuit 77. The second current measurement circuit 77 measures a value of the second drive current flowing through the first solenoid drive circuit 75 (hereinafter referred to as a second current value I2) and outputs a second current signal. In the present first embodiment, the second current measurement circuit 77 includes a not-shown shunt resistor. The second current signal has a voltage that varies in accordance with the measured second current value I2.

The first controller 70A includes a second signal line 270 that electrically couples the control circuit 71 to the first solenoid drive circuit 75. The first controller 70A includes a second enabling switch 79 on the second signal line 270. The second enabling switch 79 is controlled by the control circuit 71 and the latch circuit 88. In the present first embodiment, the second enabling switch 79 is in the form of a semiconductor switch (such as an FET), an SSR, or a mechanical relay.

2-1-3. Operation of Control Circuit

The control circuit 71 receives the power discharge permission signal or the power discharge prohibition signal from each of the first battery 200A and the second battery 200B. Based on the received power discharge permission signal or the received power discharge prohibition signal, the control circuit 71 selects the first battery 200A or the second battery 200B. When the first battery 200A is selected, the control circuit 71 turns the first battery switch 210A on and turns the second battery switch 210B off. When the second battery 200B is selected, the control circuit 71 turns the second battery switch 210B on and turns the first battery switch 210A off. In other words, while the first battery switch 210A and the second battery switch 210B can be turned off at the same time, they are not turned on at the same time. Accordingly, the power-supply line 250 does not simultaneously receive the electric powers from both of the first battery 200A and the second battery 200B; the power-supply line 250 receives the electric power from either one of the first battery 200A or the second battery 200B that is selected. In other embodiments, the first battery switch 210A and the second battery switch 210B may be turned on at the same time; and the power-supply line 250 may receive the electric powers from the first battery 200A and the second battery 200B at the same time.

The control circuit 71 outputs, to the first solenoid drive circuit 75, a first solenoid conduction signal that commands a magnetization of the first excitation coil 661, and a first solenoid non-conduction signal that commands a demagnetization of the first excitation coil 661. The control circuit 71 in the present first embodiment outputs a first solenoid control signal that serves as the first solenoid conduction signal and the first solenoid non-conduction signal. The first solenoid control signal is in the form of a binary logic signal. The first solenoid control signal having a logic HIGH corresponds to the first solenoid conduction signal; and the first solenoid control signal having a logic LOW corresponds to the first solenoid non-conduction signal. In other embodiments, the first solenoid control signal having the logic HIGH may correspond to the first solenoid non-conduction signal; and the first solenoid control signal having the logic LOW may correspond to the first solenoid conduction signal. Alternatively, in other embodiments, the mist blower 100 may include a path for transmitting the first solenoid conduction signal and a path for transmitting the first solenoid non-conduction signal in parallel, and the control circuit 71 may output the first solenoid conduction signal and the first solenoid non-conduction signal separately via these paths.

The control circuit 71 receives the activation command signal, the deactivation command signal, the rotational position signal, the power discharge permission signal, the power discharge prohibition signal, the first temperature signal, the second temperature signal, the first current signal, and the second current signal. Based on these received signals, the control circuit 71 outputs, to the motor drive circuit 72, a motor drive signal for commanding a drive of the electric motor 35 or a motor stop signal for commanding a stop of the electric motor 35. The control circuit 71 in the present first embodiment outputs a motor control signal that serves as the motor drive signal and the motor stop signal. The motor control signal is in the form of a binary logic signal. The motor control signal having a logic HIGH corresponds to the motor drive signal; and the motor control signal having a logic LOW corresponds to the motor stop signal. In other embodiments, the motor control signal having the logic HIGH may correspond to the motor stop signal; and the motor control signal having the logic LOW may correspond to the motor drive signal. Alternatively, in other embodiments, the mist blower 100 may include a path for transmitting the motor drive signal and a path for transmitting the motor stop signal in parallel, and the control circuit 71 may output the motor drive signal and the motor stop signal separately via these paths.

The control circuit 71 controls the first electromagnetic valve 66 based on a logic level of the motor control signal. In other words, the control circuit 71 outputs, to the first solenoid drive circuit 75, the first solenoid control signal having the logic level in accordance with the logic level of the motor control signal. As a consequence, the first electromagnetic valve 66 is activated (and thus opened) in association with an activation of the electric motor 35; and the first electromagnetic valve 66 is deactivated (and thus closed) in association with a deactivation of the electric motor 35.

2-1-4. Operation of Latch Circuit

The latch circuit 88 receives the first temperature signal, the second temperature signal, the first current signal, and the second current signal. The latch circuit 88 detects that the first controller 70A is in a fault condition based on these received signals. In response to the detection of the fault condition of the first controller 70A, the latch circuit 88 turns the first enabling switch 78 and the second enabling switch 79 off.

The latch circuit 88 receives the power discharge prohibition signal from each of the first battery 200A and the second battery 200B. In response to receiving the power discharge prohibition signal from each of the first battery 200A and the second battery 200B, the latch circuit 88 turns the first enabling switch 78 and the second enabling switch 79 off. Then, the latch circuit 88 keeps the first enabling switch 78 and the second enabling switch 79 turned off until a given condition is satisfied. Once the given condition is satisfied, the latch circuit 88 turns the first enabling switch 78 and the second enabling switch 79 on.

The latch circuit 88 receives the manual operation signal from the first manual switch 42. In the present first embodiment, the given condition is satisfied in response to fulfillment of the following Requirements (i) and (ii).

Requirement (i): the first controller 70A has turned into a no-fault condition from the fault condition.

Requirement (ii): the manual operation signal has changed from the deactivation command signal to the activation command signal.

In other embodiment, the given condition may be satisfied in response to fulfillment of any requirements other than Requirements (i) and (ii).

2-1-5. Processes Executed by Control Circuit 2-1-5-1. First Control Process

A first control process executed by the control circuit 71 (more specifically, by the CPU 71a) will be explained with reference to FIG. 5. The control circuit 71 initiates the first control process when activated. The user first opens the mechanical valve 65 when starting to use the mist blower 100. Therefore, the mechanical valve 65 is open when the control circuit 71 initiates the first control process.

In S10 (S represents a step), the control circuit 71 determines whether the first manual switch 42 is in the ON position. In other words, the control circuit 71 determines whether it is receiving the activation command signal from the first manual switch 42. If the first manual switch 42 is in the ON position (S10:YES), the control circuit 71 proceeds to S20. If the first manual switch 42 is in the OFF position (S10:NO), the control circuit 71 repeats the process of S10 until the first manual switch 42 is moved to the ON position.

In the subsequent S20, the control circuit 71 determines whether an error flag is set to OFF. The error flag indicates whether the first controller 70A is in the fault condition. In other words, if the first controller 70A is in the fault condition, the error flag is set to ON (or TRUE). If the first controller 70A is in the no-fault condition, the error flag is set to OFF (or FALSE).

If the error flag is set to OFF (S20:YES), the control circuit 71 proceeds to S30. If the error flag is set to ON (S20:NO), the control circuit 71 returns to S10.

In S30, the control circuit 71 activates the electric motor 35 and the first electromagnetic valve 66. More specifically, the control circuit 71 turns the first enabling switch 78 on and outputs the motor drive signal to the motor drive circuit 72. In addition, the control circuit 71 turns the second enabling switch 79 on and outputs the first solenoid conduction signal to the first solenoid drive circuit 75.

In the subsequent S40, the control circuit 71 determines whether the first manual switch 42 is in the ON position. If the first manual switch 42 is in the OFF position (S40:NO), the control circuit 71 proceeds to S50. If the first manual switch 42 is in the ON position (S40:YES), the control circuit 71 proceeds to S60.

In S50, the control circuit 71 deactivates the electric motor 35 and the first electromagnetic valve 66. More specifically, the control circuit 71 turns the first enabling switch 78 and the second enabling switch 79 off. In addition/alternatively, the control circuit 71 outputs the motor stop signal to the motor drive circuit 72 and outputs the first solenoid non-conduction signal to the first solenoid drive circuit 75. Upon completion of the process of S50, the control circuit 71 returns to S10.

In S60, the control circuit 71 determines whether the error flag is set to OFF. If the error flag is set to OFF (S60:YES), the control circuit 71 returns to S40. If the error flag is set to ON (S60:NO), the control circuit 71 proceeds to S70.

In S70, the control circuit 71 executes the process as in S50. Upon completion of the process of S70, the control circuit 71 proceeds to S80 and determines whether the first manual switch 42 is in the OFF position. More specifically, the control circuit 71 determines whether it is receiving the deactivation command signal from the first manual switch 42. If the first manual switch 42 is in the OFF position (S80:YES), the control circuit 71 returns to S10. If the first manual switch 42 is in the ON position (S80:NO), the control circuit 71 repeats the process of S80 until the first manual switch 42 is moved to the OFF position.

In a case where the error flag is turned on due to the process of S80, the electric motor 35 and the first electromagnetic valve 66 are not reactivated unless the user intentionally moves the first manual switch 42 from the OFF position to the ON position. In other words, even if the error flag turns from. ON to OFF while the first manual switch 42 is in the ON position, the electric motor 35 and the first electromagnetic valve 66 are not suddenly reactivated.

2-1-5-2. Processes for Detecting Faults

Processes for detecting faults in the first controller 70A will be explained. In the present first embodiment, the control circuit 71 executes, when activated, a faulty temperature detection process and a faulty electric current detection process along with the aforementioned first control process.

Figure 6:
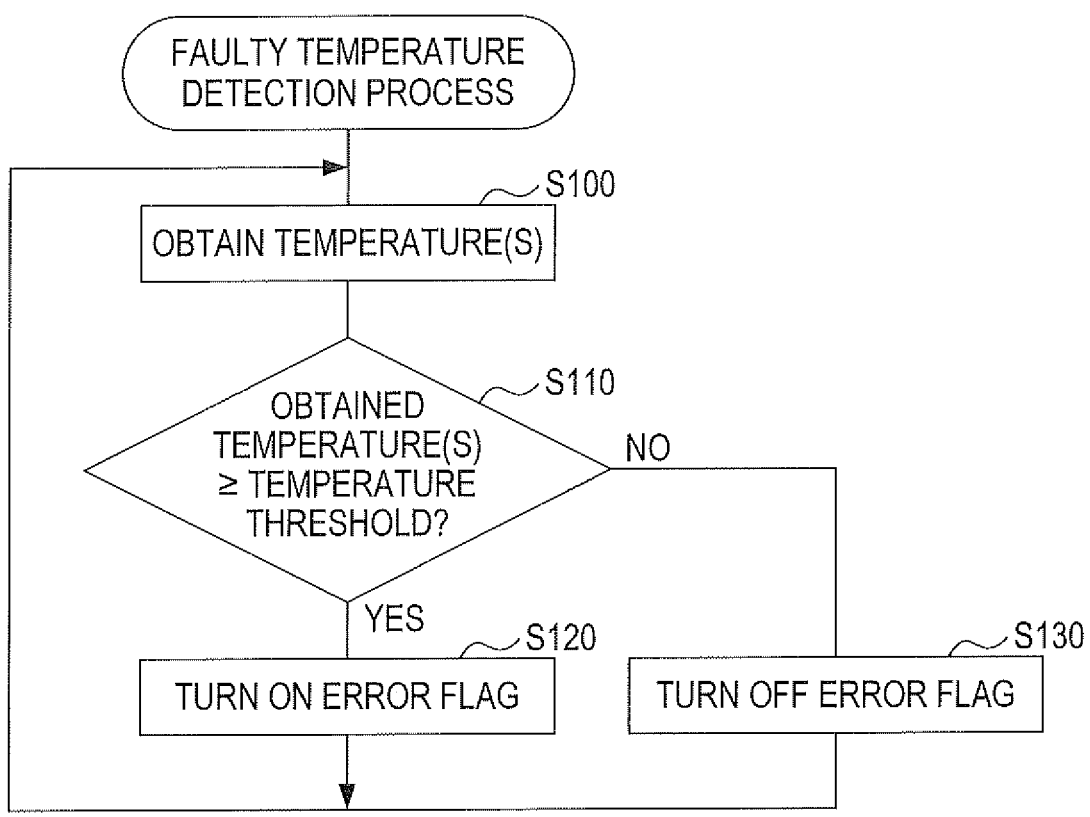
FIG. 6 is a flow chart showing a faulty temperature detection process in the first embodiment.

The faulty temperature detection process will be explained with reference to FIG. 6.

In S100, the control circuit 71 obtains the first temperature T1 and the second temperature T2. More specifically, the control circuit 71 converts the first temperature signal and the second temperature signal into respective digital values via the ADC 71c and obtains the first temperature T1 and the second temperature T2.

In the subsequent S110, the control circuit 71 determines whether the first temperature T1 or the second temperature T2 is higher than or equal to a preset temperature threshold. In the present first embodiment, the preset temperature threshold is 100° C. In other embodiments, the preset temperature threshold may be any temperature other than 100° C.

If the first temperature T1 or the second temperature T2 is higher than or equal to the preset temperature threshold (S110:YES), the control circuit 71 proceeds to S120. In S120, the control circuit 71 sets the error flag to ON and returns to S100.

In S110, if both of the first temperature T1 and the second temperature T2 are lower than the preset temperature threshold (S110:NO), the control circuit 71 proceeds to S130. In S130, the control circuit 71 sets the error flag to OFF and returns to S100.

Figure 7:
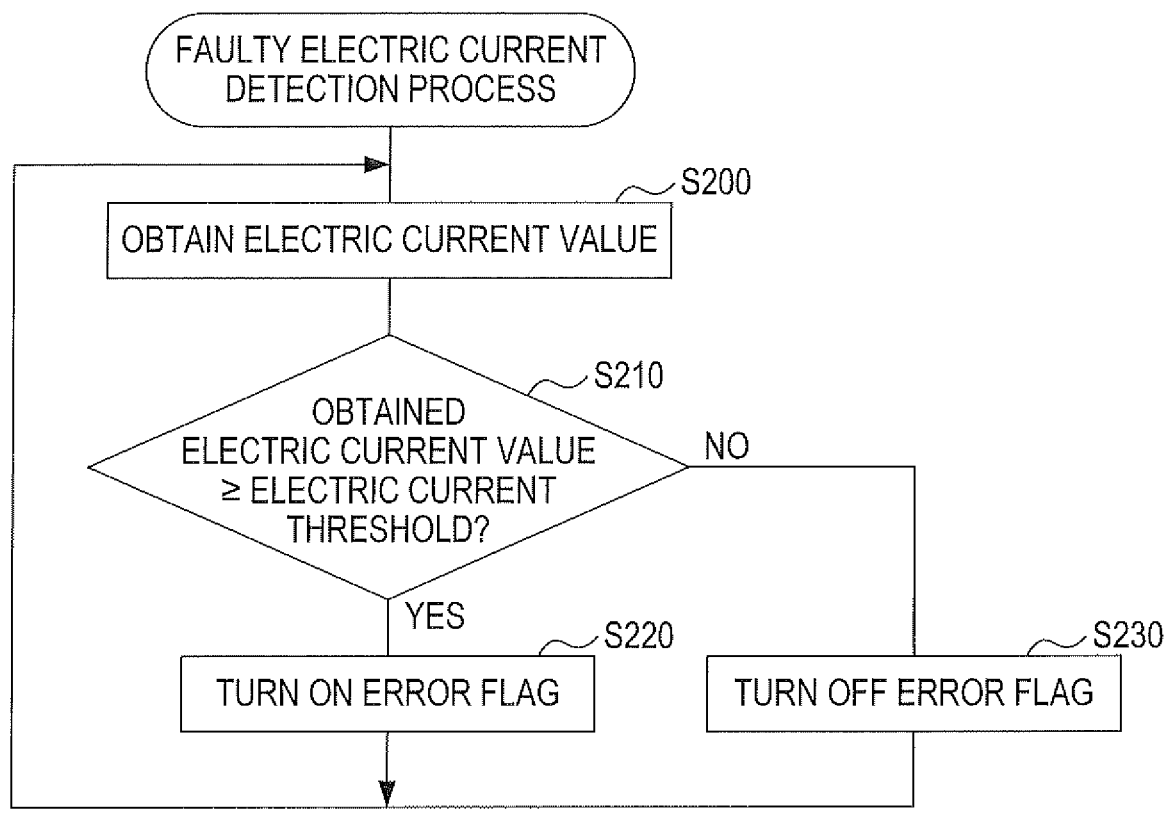
FIG. 7 is a flow chart showing a faulty electric current detection process in the first embodiment.

The faulty electric current detection process will be explained with reference to FIG. 7.

In S200, the control circuit 71 obtains the first current value I1 and the second current value I2. More specifically, the control circuit 71 converts the first current signal and the second current signal into respective digital values via the ADC 71c and obtains the first current value I1 and the second current value I2.

In the subsequent S210, the control circuit 71 determines whether the first current value I1 or the second current value I2 is greater than or equal to a preset electric current threshold. In the present first embodiment, the preset electric current threshold is 100 amperes. In other embodiments, the preset electric current threshold may be any electric current values other than 100 amperes.

If the first current value I1 or the second current value I2 is greater than or equal to the preset electric current threshold (S210:YES), the control circuit 71 proceeds to S220. In S220, the control circuit 71 sets the error flag to ON and returns to S200.

In S210, if both of the first current value I1 and the second current value I2 are less than the preset electric current threshold (S210:NO), the control circuit 71 proceeds to S230. In S230, the control circuit 71 sets the error flag to OFF and returns to S200.

2-1-6. Effects in First Embodiment

The present first embodiment as described above in detail exerts the following first through seventh effects.

First Effect: In the present first embodiment, closure of the first electromagnetic valve 66 and thus closure of the liquid feed pipe 60 are linked with the deactivation of the electric motor 35. Accordingly, the mist blower 100 can inhibit the leakage of the liquid from the liquid feed pipe 60 into the air feed pipe 40 at an inappropriate timing when the electric motor 35 is deactivated.

Second Effect: In the present first embodiment, the first electromagnetic valve 66 is activated in response to the manual operation signal changing from the deactivation command signal to the activation command signal; and the first electromagnetic valve 66 is deactivated in response to the manual operation signal changing from the activation command signal to the deactivation command signal. Accordingly, the user can activate or deactivate not only the electric motor 35 but also the first electromagnetic valve 66 by manually moving the first manual switch 42.

Third Effect: In the present first embodiment, the first electromagnetic valve 66 is closed in response to the detection that the first controller 70A is in the fault condition. Accordingly, the mist blower 100 can inhibit the leakage of the liquid from the liquid feed pipe 60 into the air feed pipe 40 at an inappropriate timing when the first controller 70A is in the fault condition.

Fourth Effect: In the present first embodiment, if it is detected that the first controller 70A is in the fault condition, the first electromagnetic valve 66 is kept closed until the first manual switch 42 is moved to the ON position via the OFF position. Accordingly, the mist blower 100 can inhibit a spray of the liquid against the user's intention.

Fifth Effect: In the present first embodiment, the mechanical valve 65 is provided with the liquid feed pipe 60. Accordingly, the mist blower 100 can inhibit the leakage of the liquid from the liquid feed pipe 60 into the air feed pipe 40 even in a case where the mist blower 100 is turned laterally or upside down.

Sixth Effect: In the present first embodiment, the first electromagnetic valve 66 is situated upstream of the liquid feed pipe 60 relative to the mechanical valve 65, in other words, close to the first controller 70A. Accordingly, wiring between the first solenoid 66a of the first electromagnetic valve 66 and the first controller 70A can be shortened.

Seventh Effect: In the present first embodiment, the liquid volume adjuster 44 is provided with the liquid feed pipe 60. Accordingly, the user can manually adjust the opening level of the liquid volume adjuster 44 to adjust the volume of the liquid to be sprayed from the air feed pipe 40.

2-2. Second Embodiment

The present second embodiment corresponds to a partially modified first embodiment. Therefore, elements that are the same as those in the first embodiment will be given the same reference numerals and their explanations will be omitted. Differences from the first embodiment will be explained hereinafter.

2-2-1. Differences from First Embodiment

Figure 5:
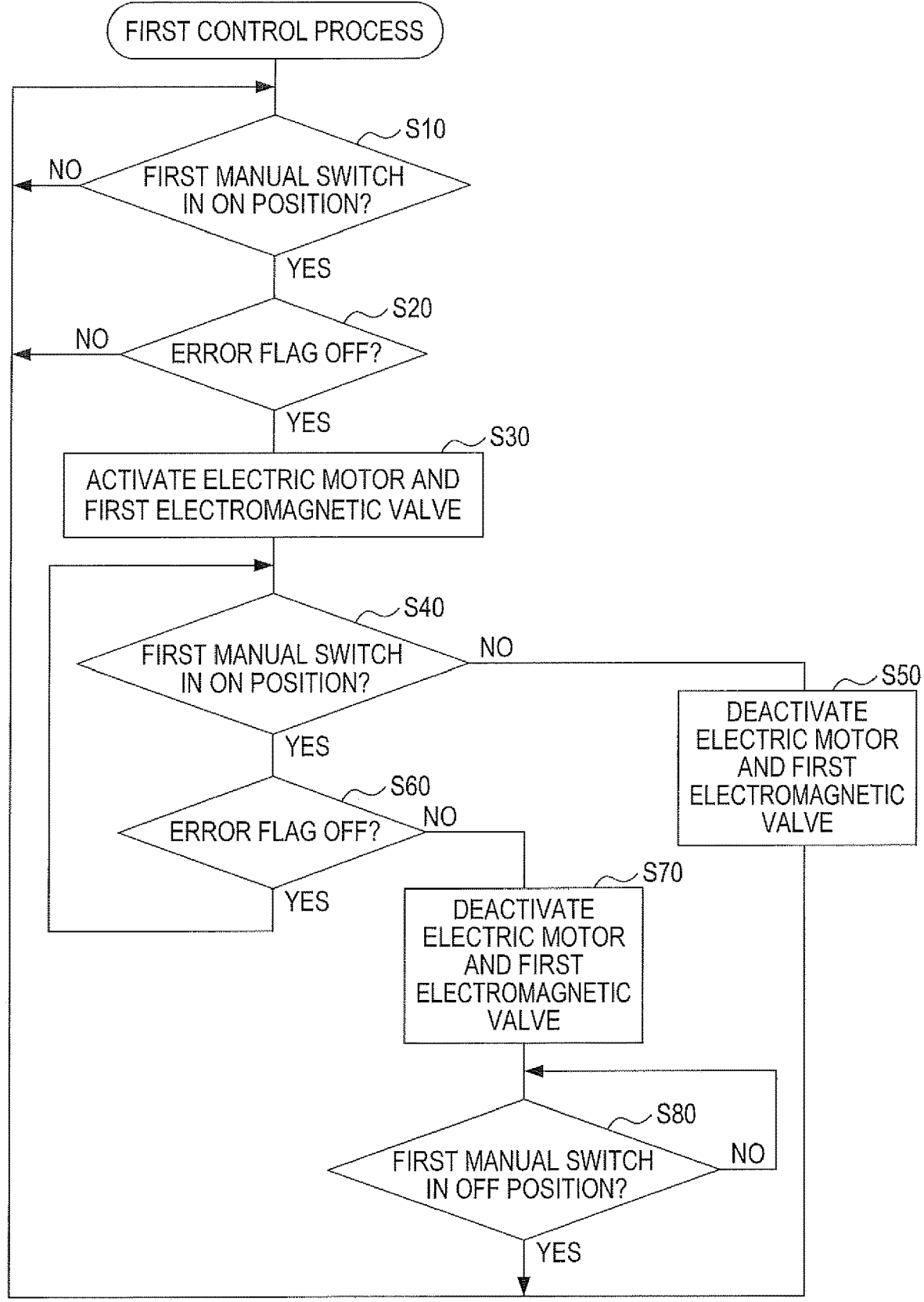
FIG. 5 is a flow chart showing a first control process in the first embodiment.
Figure 8:
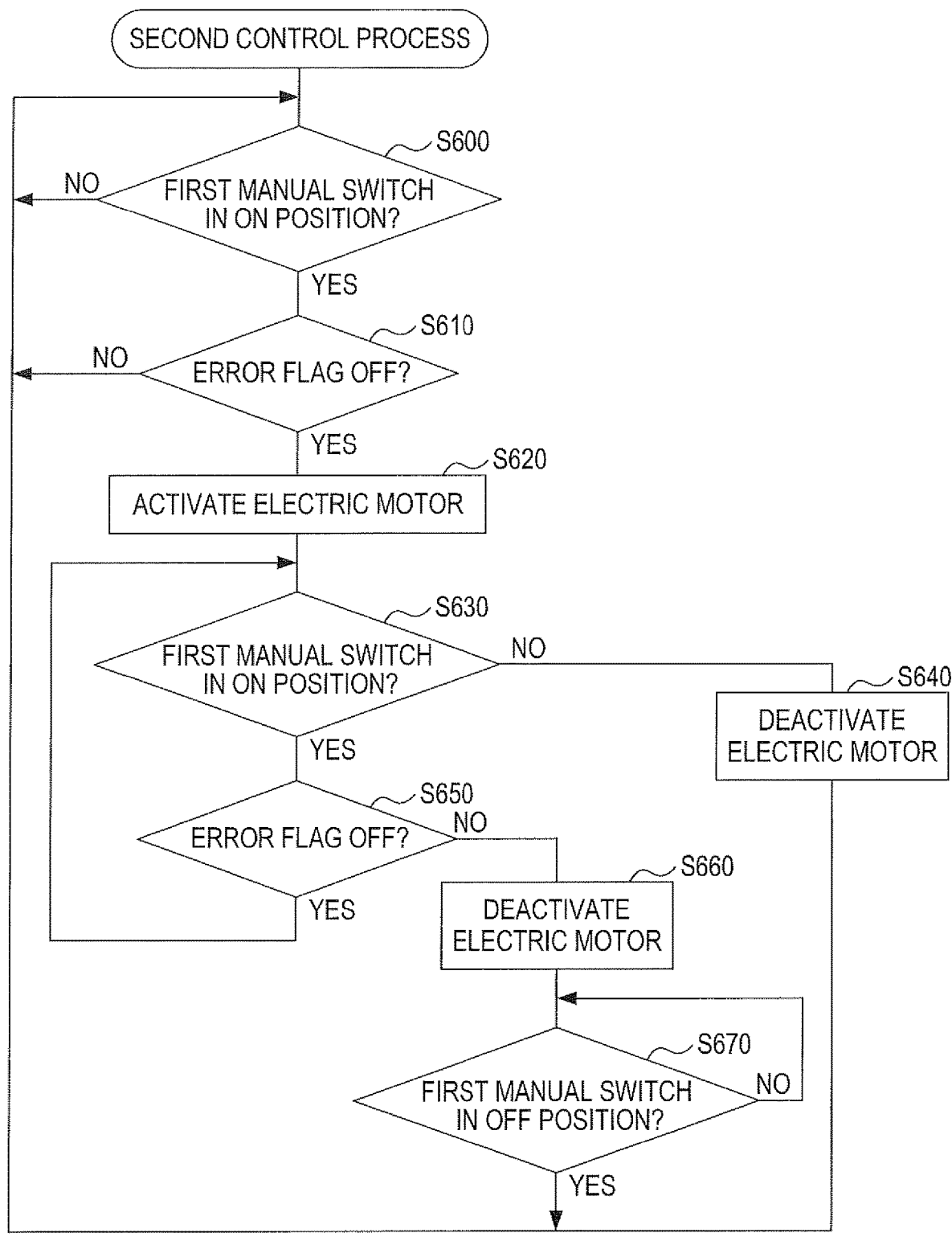
FIG. 8 is a flow chart showing a second control process in a second embodiment.
Figure 9:
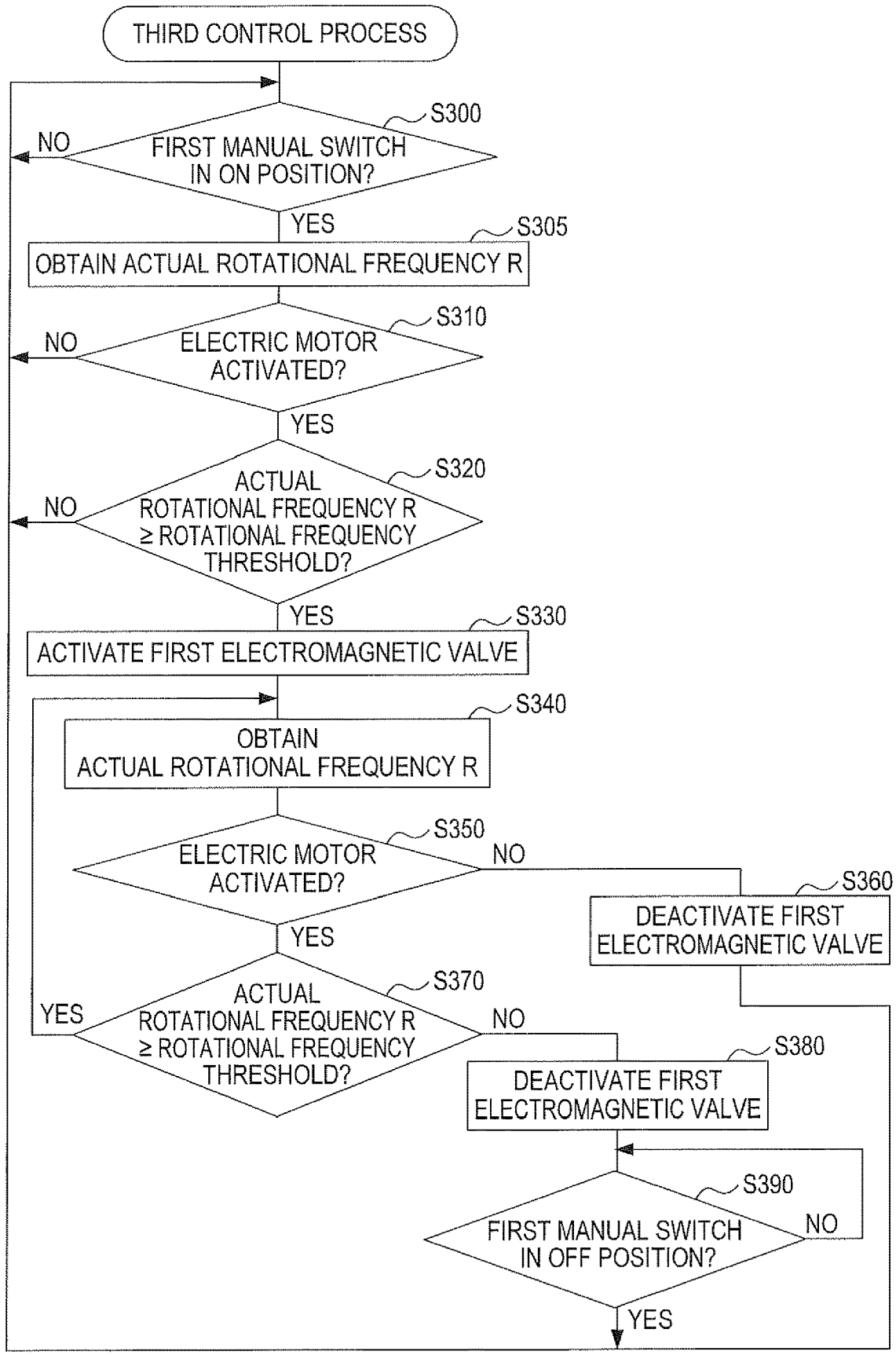
FIG. 9 is a flow chart showing a third control process in the second embodiment.

In the present second embodiment, the control circuit 71 executes, in place of the first control process described in FIG. 5, a second control process described in FIG. 8 and a third control process described in FIG. 9.

2-2-1-1. Second Control Process

The second control process will be explained with reference to FIG. 8.

In S600 and S610, the control circuit 71 executes the same processes as in S10 and S20.

In the subsequent S620, the control circuit 71 activates the electric motor 35. In other words, the control circuit 71 turns the first enabling switch 78 on and outputs the motor drive signal to the motor drive circuit 72. In the present second embodiment, the control circuit 71 does not activate the first electromagnetic valve 66 in S620.

In the subsequent S630, the control circuit 71 executes the same process as in S40. If the first manual switch 42 is in the OFF position (S630:NO), the control circuit 71 proceeds to S640. If the first manual switch 42 is in the ON position (S630:YES), the control circuit 71 proceeds to S650.

In S640, the control circuit 71 deactivates the electric motor 35. In other words, the control circuit 71 turns the first enabling switch 78 off. In addition to/alternatively, the control circuit 71 outputs the motor stop signal to the motor drive circuit 72.

In S650, the control circuit 71 determines whether the error flag is set to OFF. If the error flag is set to OFF (S650:YES), the control circuit 71 returns to S630. If the error flag is set to ON (S650:NO), the control circuit 71 proceeds to S660.

In S660, the control circuit 71 executes the same process as in S640. Upon completion of the process in S660, the control circuit 71 proceeds to S670.

In S670, the control circuit 71 executes the same process as in S80.

2-2-1-2. Third Control Process

The third control process is explained with reference to FIG. 9.

In S300, the control circuit 71 determines whether the first manual switch 42 is in the ON position. If the first manual switch 42 is in the ON position (S300:YES), the control circuit 71 proceeds to S305. If the first manual switch 42 is in the OFF position (S300:NO), the control circuit 71 repeats the process of S300 until the first manual switch 42 is moved to the ON position.

In S305, the control circuit 71 calculates an actual rotational frequency R of the electric motor 35 based on the rotational position signal received from the rotational position sensor 91.

In the subsequent S310, the control circuit 71 determines whether the electric motor 35 is activated, in other words, whether the motor drive signal is being output to the motor drive circuit 72. If the electric motor 35 is activated (S310:YES), the control circuit 71 proceeds to S320. If the electric motor 35 is deactivated (S310:NO), the control circuit 71 returns to S300.

In S320, the control circuit 71 determines whether the actual rotational frequency R calculated in S305 is higher than or equal to a preset rotational frequency threshold. The preset rotational frequency threshold corresponds to one example of the first preset rotational frequency threshold in the overview of embodiments. In the present second embodiment, the preset rotational frequency threshold corresponds to 10,000 revolutions/minute (10,000 revolutions per one minute). In other embodiments, the preset rotational frequency threshold may corresponds to any revolutions/minute other than 10,000 revolutions/minute.

If the actual rotational frequency R is higher than or equal to the preset rotational frequency threshold (S320:YES), the control circuit 71 proceeds to S330. If the actual rotational frequency R is lower than the preset rotational frequency threshold (S320:NO), the control circuit 71 returns to S300.

In S330, the control circuit 71 activates the first electromagnetic valve 66. In other words, the control circuit 71 turns the second enabling switch 79 on and outputs the first solenoid conduction signal to the first solenoid drive circuit 75. In the present second embodiment, the control circuit 71 does not initiate the activation of the first electromagnetic valve 66 simultaneously with the activation of the electric motor 35. If the actual rotational frequency R of the electric motor 35 is lower than the preset rotational frequency threshold, the flow speed of the airflow inside the air feed pipe 40 is relatively low. If the liquid is discharged from the nozzle 63 into the airflow having a low flow speed, the liquid may not be atomized. Accordingly, in the present second embodiment, the control circuit 71 activates the first electromagnetic valve 66 when the actual rotational frequency R of the electric motor 35 is higher than or equal to the preset rotational frequency threshold.

In the subsequent S340, the control circuit 71 recalculates the actual rotational frequency R of the electric motor 35 based on the rotational position signal received from the rotational position sensor 91.

In the subsequent S350, the control circuit 71 determines whether the electric motor 35 is activated, in other words, whether the control circuit 71 is outputting the motor drive signal to the motor drive circuit 72. If the electric motor 35 is deactivated (S350:NO), the control circuit 71 proceeds to S360. If the electric motor 35 is activated (S350:YES), the control circuit 71 proceeds to S370.

In S360, the control circuit 71 deactivates the first electromagnetic valve 66. In other words, the control circuit 71 turns the second enabling switch 79 off. In addition to/alternatively, the control circuit 71 outputs the first solenoid non-conduction signal to the first solenoid drive circuit 75. In a case where the electric motor 35 is deactivated, the control circuit 71 immediately deactivates the first electromagnetic valve 66 and stops discharging the liquid from the nozzle 63.

In S370, the control circuit 71 determines whether the actual rotational frequency R recalculated in S340 is higher than or equal to the preset rotational frequency threshold. If the actual rotational frequency R is higher than or equal to the preset rotational frequency threshold (S370:YES), the control circuit 71 returns to S340. If the actual rotational frequency R is lower than the preset rotational frequency threshold (S370:NO), the control circuit 71 proceeds to S380.

In S380, the control circuit 71 executes the same process as in S360. In the present second embodiment, if the actual rotational frequency R falls below the preset rotational frequency threshold while the electric motor 35 is activated, the control circuit 71 deactivates the first electromagnetic valve 66 and stops discharging the liquid from the nozzle 63. Upon completion of the process of S380, the control circuit 71 proceeds to S390 and executes the same process as in S80.

2-2-2. Effects in Second Embodiment

The present second embodiment exerts, in addition to the aforementioned first through seventh effects, the following eighth effect.

Eighth Effect: In the present second embodiment, the first electromagnetic valve 66 is opened in response to the actual rotational frequency R of the electric motor 35 being higher than or equal to the preset rotational frequency threshold. Accordingly, the mist blower 100 in the present second embodiment can adequately atomize the liquid and spray the adequately atomized liquid.

2-3. Third Embodiment

The present third embodiment corresponds to a partially modified first embodiment. Therefore, elements that are the same as those in the first embodiment will be given the same reference numerals and their explanations will be omitted. Differences from the first embodiment will be explained hereinafter.

2-3-1. Differences from First Embodiment

Figure 10:
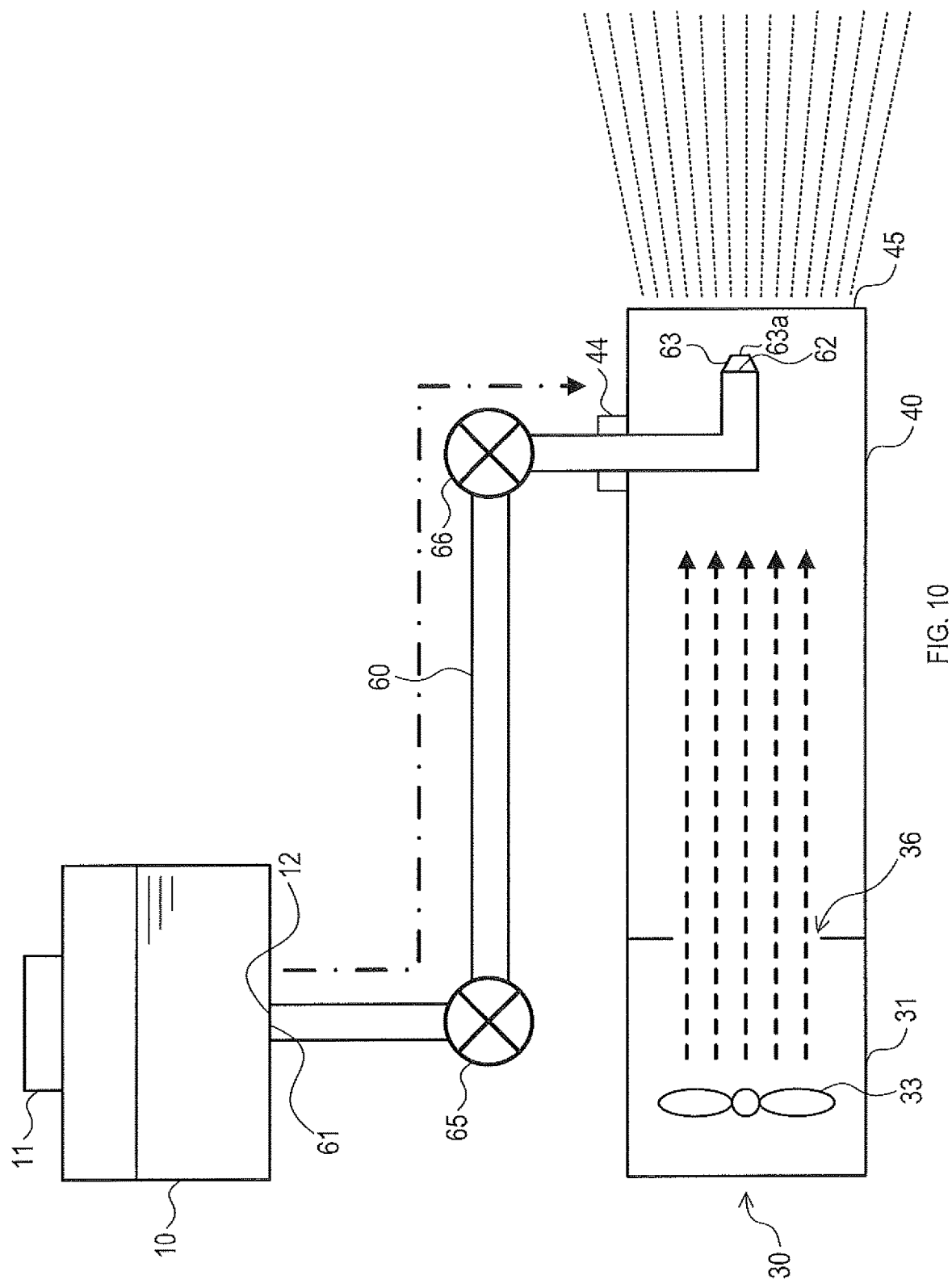
FIG. 10 is a schematic drawing showing an air passage and a liquid passage of a mist blower in a third embodiment.

In the aforementioned first embodiment, the first electromagnetic valve 66 is situated upstream of the liquid feed pipe 60 relative to the mechanical valve 65. Meanwhile, the present third embodiment is different from the first embodiment in that, as shown in FIG. 10, the first electromagnetic valve 66 is situated downstream of the liquid feed pipe 60 relative to the mechanical valve 65. In other words, the first electromagnetic valve 66 is arranged so as to receive the liquid having passed the mechanical valve 65.

2-3-2. Effects in Third Embodiment

The present third embodiment exerts, in addition to the aforementioned first through fifth, and seventh effects, the following ninth effect.

Ninth Effect: In the present third embodiment, the first electromagnetic valve 66, which is situated downstream of the liquid feed pipe 60, closes the liquid feed pipe 60 near the outflow port 62. Accordingly, the liquid that remains between the first electromagnetic valve 66 and the outflow port 62 is reduced. As a consequence, the mist blower 100 in the present third embodiment can further reduce the liquid to leak when the user fails to close the mechanical valve 65.

2-4. Fourth Embodiment

The present fourth embodiment corresponds to a partially modified first embodiment. Therefore, elements that are the same as those in the first embodiment will be given the same reference numerals and their explanations will be omitted. Differences from the first embodiment will be explained hereinafter.

2-4-1. Differences from First Embodiment

2-4-1-1. Mechanical Structure

Figure 11:
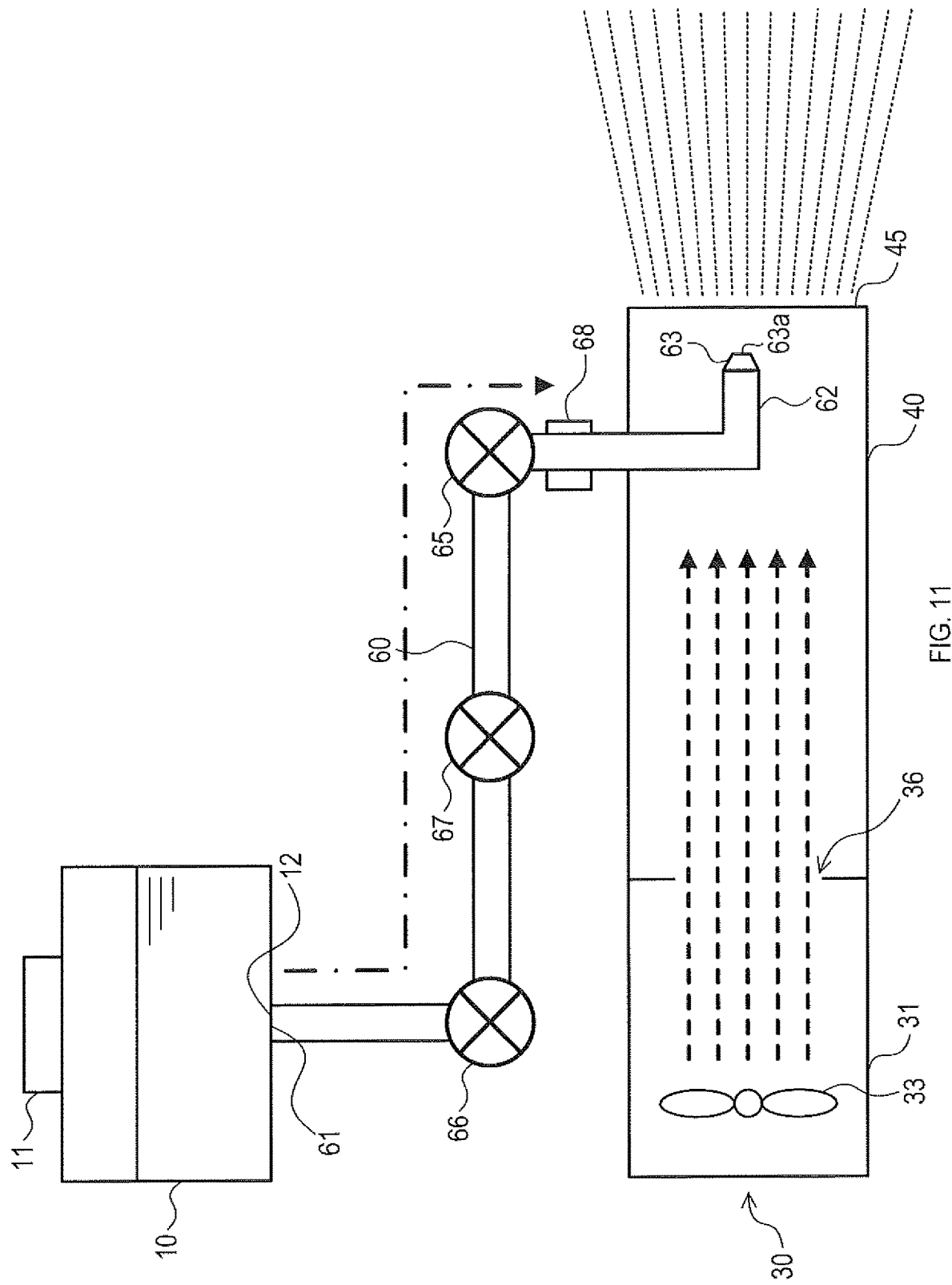
FIG. 11 is a schematic drawing showing an air passage and a liquid passage of a mist blower in a fourth embodiment.

As shown in FIG. 11, the mist blower 100 in the present fourth embodiment additionally includes a second electromagnetic valve 67 between the mechanical valve 65 and the first electromagnetic valve 66 with the liquid feed pipe 60 (in other words, upstream of the mechanical valve 65 and downstream of the first electromagnetic valve 66). The second electromagnetic valve 67 have the same configuration as that of the first electromagnetic valve 66.

Furthermore, the mist blower 100 in the present fourth embodiment additionally includes a flow rate sensor 68 downstream of the mechanical valve 65 in the liquid feed pipe 60. The flow rate sensor 68 measures a flow rate Q of the liquid flowing inside the liquid feed pipe 60 and outputs a flow rate signal to the control circuit 71. The flow rate signal has a voltage that varies in accordance with the measured flow rate Q.

The liquid volume adjuster 44 is excluded in the mist blower 100 in the present fourth embodiment.

2-4-1-2. Electrical Configuration

Figure 12:
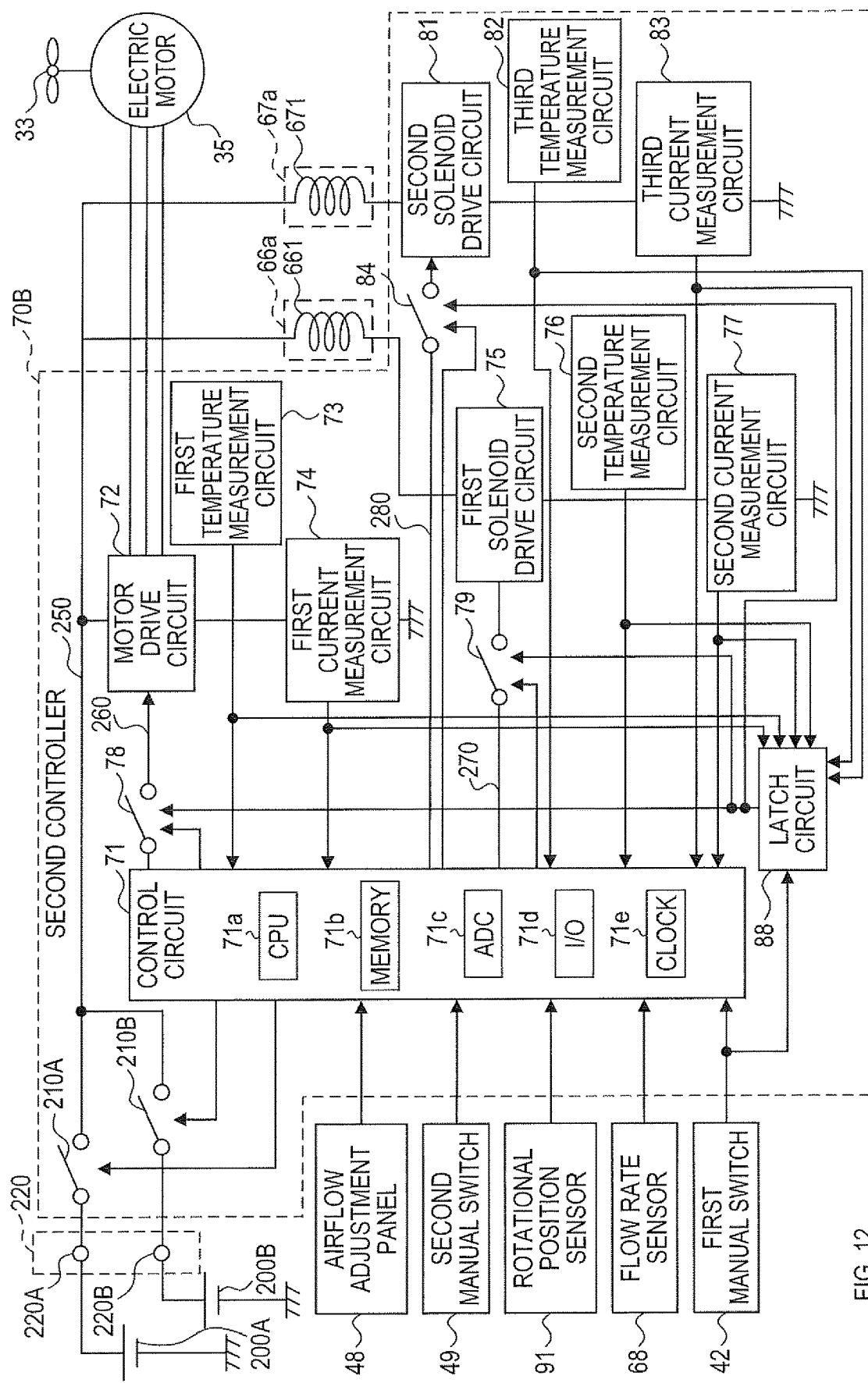
FIG. 12 is a block diagram showing an electrical configuration of the mist blower in the fourth embodiment.

As shown in FIG. 12, the mist blower 100 in the present fourth embodiment additionally includes a second manual switch 49. The second manual switch 49 in the present fourth embodiment is in the form of a dial switch. In other embodiments, the second manual switch 49 may be in any form other than the dial switch, such as a push-button switch, a slide switch, a touch panel, a touch screen, and a GUI.

In the present fourth embodiment, the second manual switch 49 is disposed on the grip 41. In other embodiments, the second manual switch 49 may be disposed on any part of the mist blower 100 other than the grip 41.

The second manual switch 49 is manually rotated by the user to set a liquid volume level to be sprayed. The second manual switch 49 is configured to be selectively rotated to any one of two or more rotational positions. Those two or more rotational positions are associated with respective two or more liquid volume levels. In the present fourth embodiment, the liquid volume level is increased or decreased in stages in accordance with the rotation of the second manual switch 49. In the present fourth embodiment, the second manual switch 49 is configured to selectively set any one of six liquid volume levels. In other embodiments, the second manual switch 49 may be configured to selectively set any one of two or more and five or less liquid volume levels or seven or more liquid volume levels.

The second manual switch 49 outputs a liquid volume designating signal. The liquid volume designating signal has a voltage that varies in accordance with the rotational position of the second manual switch 49.

The mist blower 100 in the present fourth embodiment includes, in place of the first controller 70A, a second controller 70B.

The second controller 70B corresponds to the first controller 70A that is modified as explained below.

The second controller 70B additionally includes a second solenoid drive circuit 81. The second electromagnetic valve 67 includes a second solenoid 67a. The second solenoid 67a includes a second excitation coil 671 and a not-shown second plunger (specifically, an iron piece). The second excitation coil 671 has a first end coupled to the power-supply line 250. The second excitation coil 671 has a second end coupled to the second solenoid drive circuit 81. The second solenoid drive circuit 81 conducts or interrupts a third drive current from the power-supply line 250 to the second excitation coil 671. In response to the third drive current flowing through the second excitation coil 671, the second excitation coil 671 is magnetized and attracts the second plunger, which consequently causes the second electromagnetic valve 67 to open. In response to the third drive current being interrupted, the second excitation coil 671 is demagnetized and releases the second plunger, which consequently causes the second electromagnetic valve 67 to close.

The second controller 70B additionally includes a third temperature measurement circuit 82 disposed in the vicinity of the second solenoid drive circuit 81. The third temperature measurement circuit 82 measures a temperature of the second solenoid drive circuit 81 (hereinafter referred to as a third temperature T3) and outputs a third temperature signal to the control circuit 71 and to the latch circuit 88. In the present fourth embodiment, the third temperature measurement circuit 82 includes a not-shown thermistor. The third temperature signal has a voltage that varies in accordance with the measured third temperature T3.

The second controller 70B additionally includes a third current measurement circuit 83. The third current measurement circuit 83 measures a value of the third drive current flowing through the second solenoid drive circuit 81 (hereinafter referred to as a third current value I3) and outputs a third current signal to the control circuit 71 and to the latch circuit 88. In the present fourth embodiment, the third current measurement circuit 83 includes a not-shown shunt resistor. The third current signal has a voltage that varies in accordance with the measured third current value I3.

The second controller 70B additionally includes a third signal line 280 that electrically couples the control circuit 71 to the second solenoid drive circuit 81. The second controller 70B additionally includes a third enabling switch 84 on the third signal line 280. The third enabling switch 84 is controlled by the control circuit 71 and the latch circuit 88. In the present fourth embodiment, the third enabling switch 84 is in the form of a semiconductor switch (such as an FET), an SSR, or a mechanical relay.

2-4-1-3. Operation of Control Circuit

The operation of the control circuit 71 in the present fourth embodiment is modified from the operation of the control circuit 71 of the first embodiment as explained below.

The control circuit 71 in the present fourth embodiment outputs, to the second solenoid drive circuit 81, a second solenoid conduction signal that commands a magnetization of the second excitation coil 671, and a second solenoid non-conduction signal that commands a demagnetization of the second excitation coil 671. The control circuit 71 in the present fourth embodiment outputs a second solenoid control signal that serves as the second solenoid conduction signal and the second solenoid non-conduction signal. The second solenoid control signal is in the form of a binary logic signal. The second solenoid control signal having a logic HIGH corresponds to the second solenoid conduction signal; and the second solenoid control signal having a logic LOW corresponds to the second solenoid non-conduction signal. In other embodiments, the second solenoid control signal having the logic HIGH may correspond to the second solenoid non-conduction signal; and the second solenoid control signal having the logic LOW may correspond to the second solenoid conduction signal. Alternatively, in other embodiments, the mist blower 100 may include a path for transmitting the second solenoid conduction signal and a path for transmitting the second solenoid non-conduction signal in parallel, and the control circuit 71 may output the second solenoid conduction signal and the second solenoid non-conduction signal separately via these paths.

The control circuit 71 in the present fourth embodiment receives the third temperature signal and the third current signal in addition to the activation command signal, the deactivation command signal, the rotational position signal, the power discharge permission signal, the power discharge prohibition signal, the first temperature signal, the second temperature signal, the first current signal, and the second current signal. Based on these received signals, the control circuit 71 outputs the motor drive signal or the motor stop signal to the motor drive circuit 72.

The control circuit 71 in the present fourth embodiment receives the liquid volume designating signal from the second manual switch 49, and based on the received liquid volume designating signal, controls the opening level of the first electromagnetic valve 66.

As shown in FIG. 13, two or more liquid volume levels (six liquid volume levels in the present fourth embodiment) are associated with respective two or more opening levels (six opening levels in the present fourth embodiment) of the first electromagnetic valve 66. The first solenoid control signal generated by the control circuit 71 in the present fourth embodiment not only opens or closes the first electromagnetic valve 66 but also controls the opening level of the first electromagnetic valve 66 in accordance with the liquid volume designating signal. More specifically, the first solenoid control signal in the present fourth embodiment is in the form of a multi-level logic signal having a voltage that varies in association with each of the two or more opening levels. The control circuit 71 outputs such a first solenoid control signal to the first solenoid drive circuit 75.

2-4-1-4. Operation of Latch Circuit

The latch circuit 88 in the present fourth embodiment receives the third temperature signal and the third current signal in addition to the first temperature signal, the second temperature signal, the first current signal, and the second current signal. Based on these received signals, the latch circuit 88 detects that the second controller 70B is in the fault condition. In response to the detection of the fault condition of the second controller 70B, the latch circuit 88 turns the first enabling switch 78, the second enabling switch 79, and the third enabling switch 84 off.

2-4-1-5. Fourth Control Process

Figure 14:
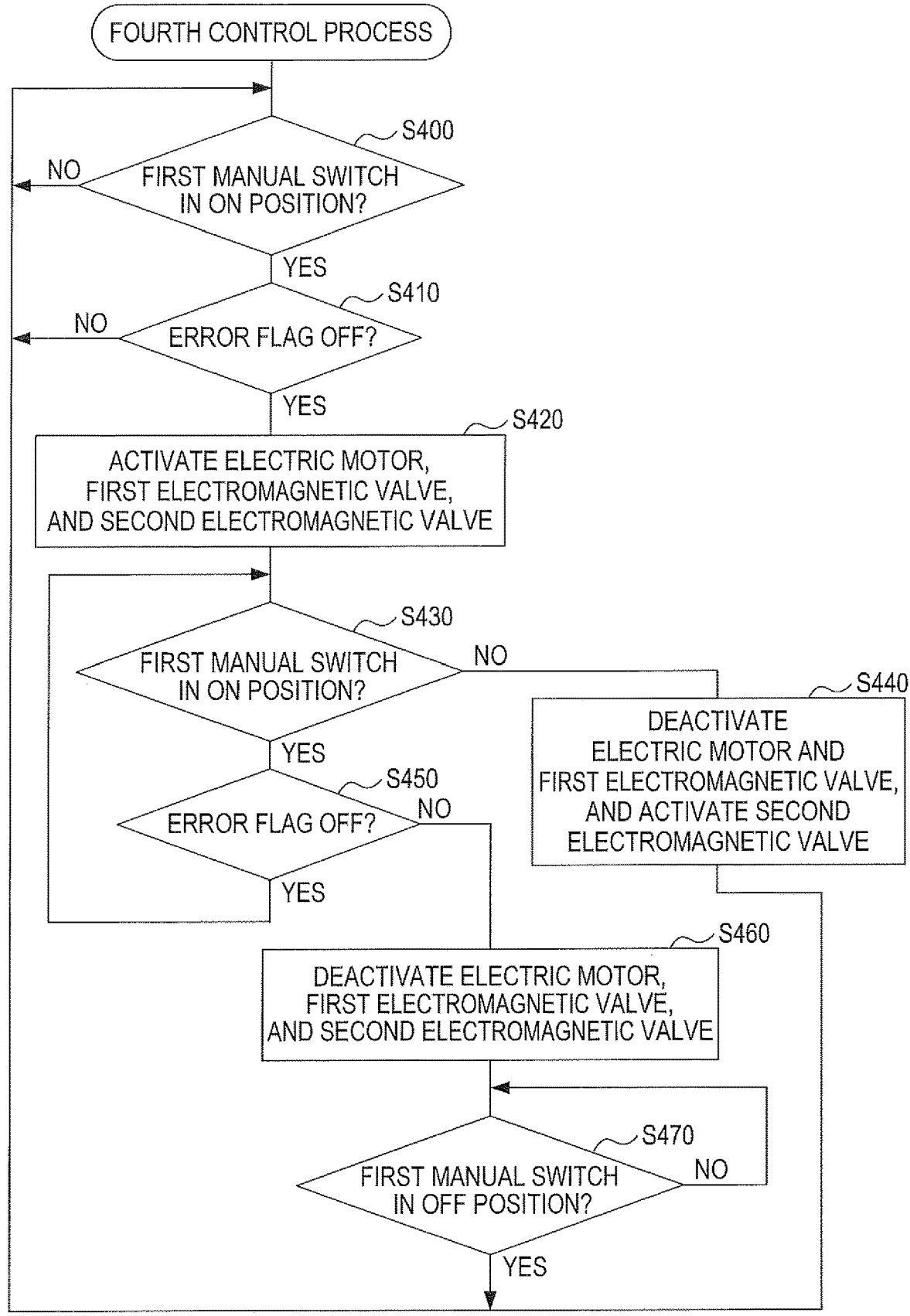
FIG. 14 is a flow chart showing a fourth control process in the fourth embodiment.

A fourth control process executed by the control circuit 71 in the present fourth embodiment will be explained with reference to FIG. 14. The mechanical valve 65 is open when the control circuit 71 initiates the fourth control process.

In S400 and S410, the control circuit 71 executes the same processes as in S10 and S20.

In the subsequent S420, the control circuit 71 activates the electric motor 35, the first electromagnetic valve 66, and the second electromagnetic valve 67. More specifically, the control circuit 71 turns the first enabling switch 78 on and outputs the motor drive signal to the motor drive circuit 72. In addition, the control circuit 71 turns the second enabling switch 79 on and outputs the first solenoid conduction signal to the first solenoid drive circuit 75. Furthermore, the control circuit 71 turns the third enabling switch 84 on and outputs the second solenoid conduction signal to the second solenoid drive circuit 81.

In the subsequent S430, the control circuit 71 determines whether the first manual switch 42 is in the ON position. If the first manual switch 42 is in the ON position (S430:YES), the control circuit 71 proceeds to S450. If the first manual switch 42 is in the OFF position (S430:NO), the control circuit 71 proceeds to S440.

In S440, the control circuit 71 deactivates the electric motor 35 and the first electromagnetic valve 66 and keeps activating the second electromagnetic valve 67. In other words, the second electromagnetic valve 67 is kept opened while the first electromagnetic valve 66 is closed. If the first electromagnetic valve 66 is closed properly, the liquid does not flow into the air feed pipe 40 even when the second electromagnetic valve 67 is opened. Upon completion of the process of S440, the control circuit 71 returns to S400.

In S450, the control circuit 71 determines whether the error flag is set to OFF. If the error flag is set to OFF (S450:YES), the control circuit 71 returns to S430. If the error flag is set to ON (S450:NO), the control circuit 71 proceeds to S460.

In S460, the control circuit 71 deactivates the electric motor 35, the first electromagnetic valve 66, and the second electromagnetic valve 67. In other words, both of the first electromagnetic valve 66 and the second electromagnetic valve 67 are closed, This means that, if the second controller 70B is in the fault condition, the control circuit 71 closes the first electromagnetic valve 66 and the second electromagnetic valve 67 and stops discharging the liquid from the nozzle 63. Upon completion of the process of S460, the control circuit 71 proceeds to S470.

In S470, the control circuit 71 determines whether the first manual switch 42 is in the OFF position. If the first manual switch 42 is in the OFF position (S470:YES), the control circuit 71 returns to S400. If the first manual switch 42 is in the ON position (S470:NO), the control circuit 71 repeats the process of S470 until the first manual switch 42 is moved to the OFF position.

2-4-1-6. Processes for Detecting Faults

In the faulty temperature detection process (see FIG. 6) in the present fourth embodiment, the control circuit 71 obtains in S100 the third temperature T3 in addition to the first temperature T1 and the second temperature T2. More specifically, the control circuit 71 converts the first through third temperature signals into respective digital values via the ADC 71c and obtains the first through third temperatures T1 through T3. In the subsequent S110, the control circuit 71 determines whether any one of the first through third temperatures T1 through T3 is higher than or equal to the preset temperature threshold.

In the faulty electric current detection process (see FIG. 7) in the present fourth embodiment, the control circuit 71 obtains in S200 the third current value I3 in addition to the first current value I1 and the second current value I2. More specifically, the control circuit 71 converts the first through third current signals into respective digital values via the ADC 71c and obtains the first through third current values I1 through I3. In the subsequent S210, the control circuit 71 determines whether any one of the first through third current values I1 through I3 is greater than or equal to the preset electric current threshold.

In the present fourth embodiment, the control circuit 71 executes a faulty flow rate detection process in addition to the faulty temperature detection process and the faulty electric current detection process.

Figure 15:
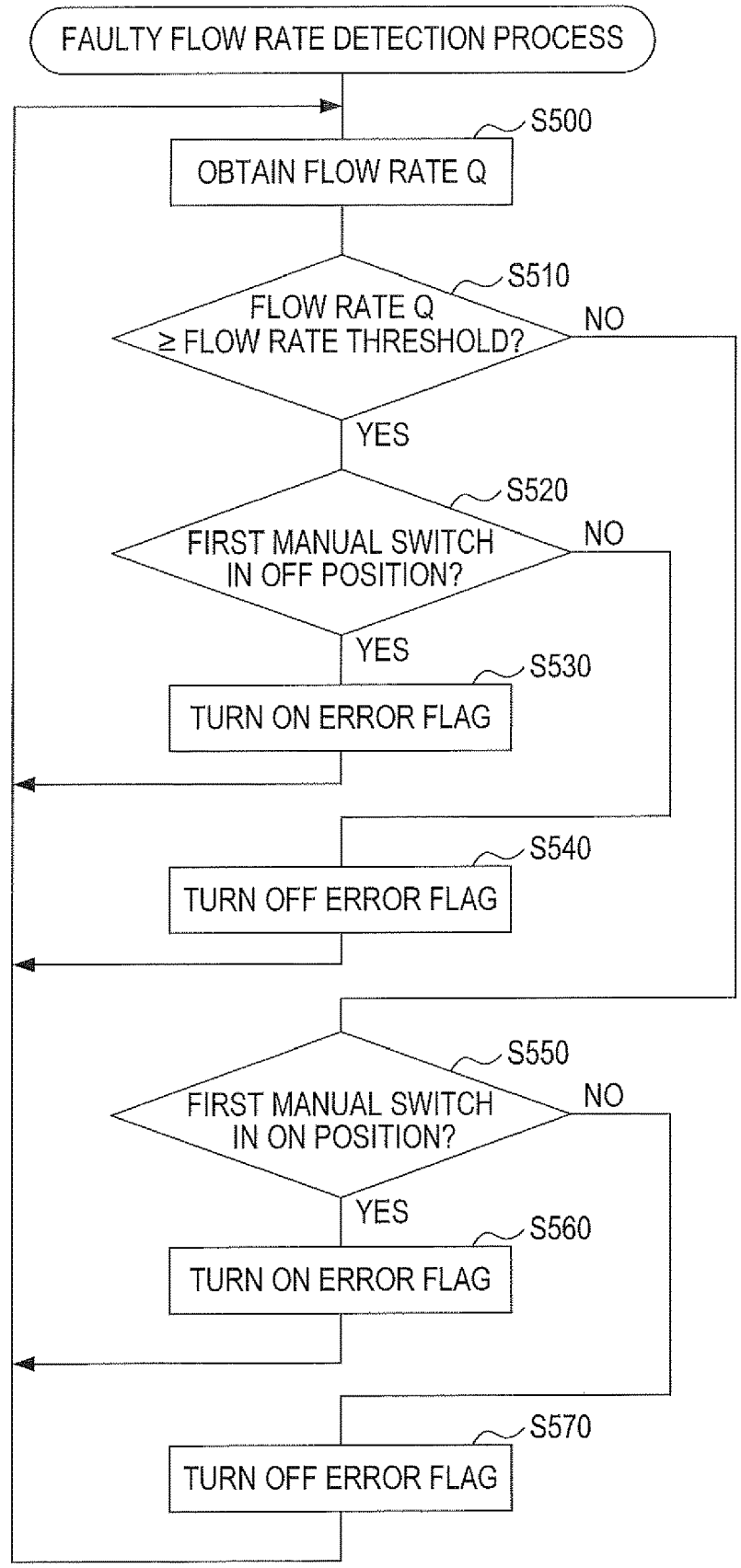
FIG. 15 is a flow chart showing a faulty flow rate detection process in the fourth embodiment.

The faulty flow rate detection process will be explained with reference to FIG. 15.

In S500, the control circuit 71 obtains a flow rate Q. More specifically, the control circuit 71 converts the flow rate signal into a digital value via the ADC 71c and obtains the flow rate Q.

In the subsequent S510, the control circuit 71 determines whether the obtained flow rate Q is greater than or equal to a preset flow rate threshold. The preset flow rate threshold corresponds to one example of the first preset flow rate threshold and also to one example of the second preset flow rate threshold in the overview of embodiments. The preset flow rate threshold is a threshold for determining whether the liquid is flowing through the liquid feed pipe 60. If the flow rate Q is greater than or equal to the preset flow rate threshold (S510:YES), the control circuit 71 proceeds to S520. If the flow rate Q is less than the preset flow rate threshold (S510:NO), the control circuit 71 proceeds to S550.

In S520, the control circuit 71 determines whether the first manual switch 42 is in the OFF position. In other words, the control circuit 71 determines whether it is receiving the deactivation command signal from the first manual switch 42. If the first manual switch 42 is in the OFF position (S520:YES), the control circuit 71 proceeds to S530. If the first manual switch 42 is in the ON position (S520:NO), the control circuit 71 proceeds to S540.

In S530, the control circuit 71 sets the error flag to ON and returns to S500. If the first manual switch 42 is in the OFF position, the first electromagnetic valve 66 is closed and therefore the liquid should not be flowing through the liquid feed pipe 60. If the flow rate Q is greater than or equal to the preset flow rate threshold albeit that the first electromagnetic valve 66 is closed, the first electromagnetic valve 66 may have a fault. Therefore, in S530, the error flag is set to ON. In association with S530, the second electromagnetic valve 67 is closed in the aforementioned fourth control process.

In S540, the control circuit 71 sets the error flag to OFF and returns to S500.

In S550, the control circuit 71 determines whether the first manual switch 42 is in the ON position. In other words, the control circuit 71 determines whether it is receiving the activation command signal from the first manual switch 42. If the first manual switch 42 is in the ON position (S550:YES), the control circuit 71 proceeds to S560. If the first manual switch 42 is in the OFF position (S550:NO), the control circuit 71 proceeds to S570.

In S560, the control circuit 71 sets the error flag to ON and returns to S500. If the first manual switch 42 is in the ON position, the first electromagnetic valve 66 is opened and therefore the liquid should be flowing through the liquid feed pipe 60. If the flow rate Q is less than the preset flow rate threshold albeit that the first electromagnetic valve 66 is opened, the first electromagnetic valve 66 may have a fault. Therefore, in S560, the error flag is set to ON. In association with S560, the first electromagnetic valve 66 and the second electromagnetic valve 67 are closed in the aforementioned fourth control process.

In S570, the control circuit 71 sets the error flag to OFF and returns to S500.

2-4-2. Effects in Fourth Embodiment

The mist blower 100 of the present fourth embodiment exerts, in addition to the aforementioned first through seventh effects, the following tenth through fourteenth effects.

Tenth Effect: In the mist blower 100 of the present fourth embodiment, the opening level of the first electromagnetic valve 66 is controlled in accordance with the liquid volume level designated via the second manual switch 49. Accordingly, the mist blower 100 of the present fourth embodiment can adjust the volume of the liquid to be sprayed to the liquid volume level set by the user.

Eleventh Effect: The mist blower 100 of the present fourth embodiment can measure the flow rate Q of the liquid flowing through the liquid feed pipe 60 by the flow rate sensor 68 disposed downstream of the first electromagnetic valve 66, and in addition, based on the measured flow rate Q, can detect that the first electromagnetic valve 66 has a fault.

Twelfth Effect: With the second electromagnetic valve 67 provided with the liquid feed pipe 60 in addition to the first electromagnetic valve 66, the mist blower 100 of the present fourth embodiment can inhibit the leakage of the liquid from the liquid feed pipe 60 into the air feed pipe 40 while the electric motor 35 is deactivated with the first electromagnetic valve 66 having a fault.

Thirteenth Effect: In the mist blower 100 in the present fourth embodiment, in a case where (i) the first manual switch 42 is in the OFF position and (ii) the flow rate Q is greater than or equal to the preset flow rate threshold, the second electromagnetic valve 67 is closed. Accordingly, the mist blower 100 in the present fourth embodiment can inhibit the leakage of the liquid from the liquid feed pipe 60 into the air feed pipe 40 while the electric motor 35 is deactivated with the first electromagnetic valve 66 having a fault and not closed.

Fourteenth Effect: In the mist blower 100 in the present fourth embodiment, in a case where (i) the first manual switch 42 is in the ON position and (ii) the flow rate Q is less than the preset flow rate threshold, the first electromagnetic valve 66 and the second electromagnetic valve 67 are closed. Accordingly, the mist blower 100 in the present fourth embodiment can inhibit the leakage of the liquid from the liquid feed pipe 60 into the air feed pipe 40 when the electric motor 35 is activated with the first electromagnetic valve 66 having a fault and insufficiently opened.

2-5. Fifth Embodiment

The present fifth embodiment corresponds to a partially modified second embodiment. Therefore, elements that are the same as those in the second embodiment will be given the same reference numerals and their explanations will be omitted. Differences from the second embodiment will be explained hereinafter.

2-5-1. Differences from Second Embodiment

2-5-1-1. Mechanical Structure

Figure 16:
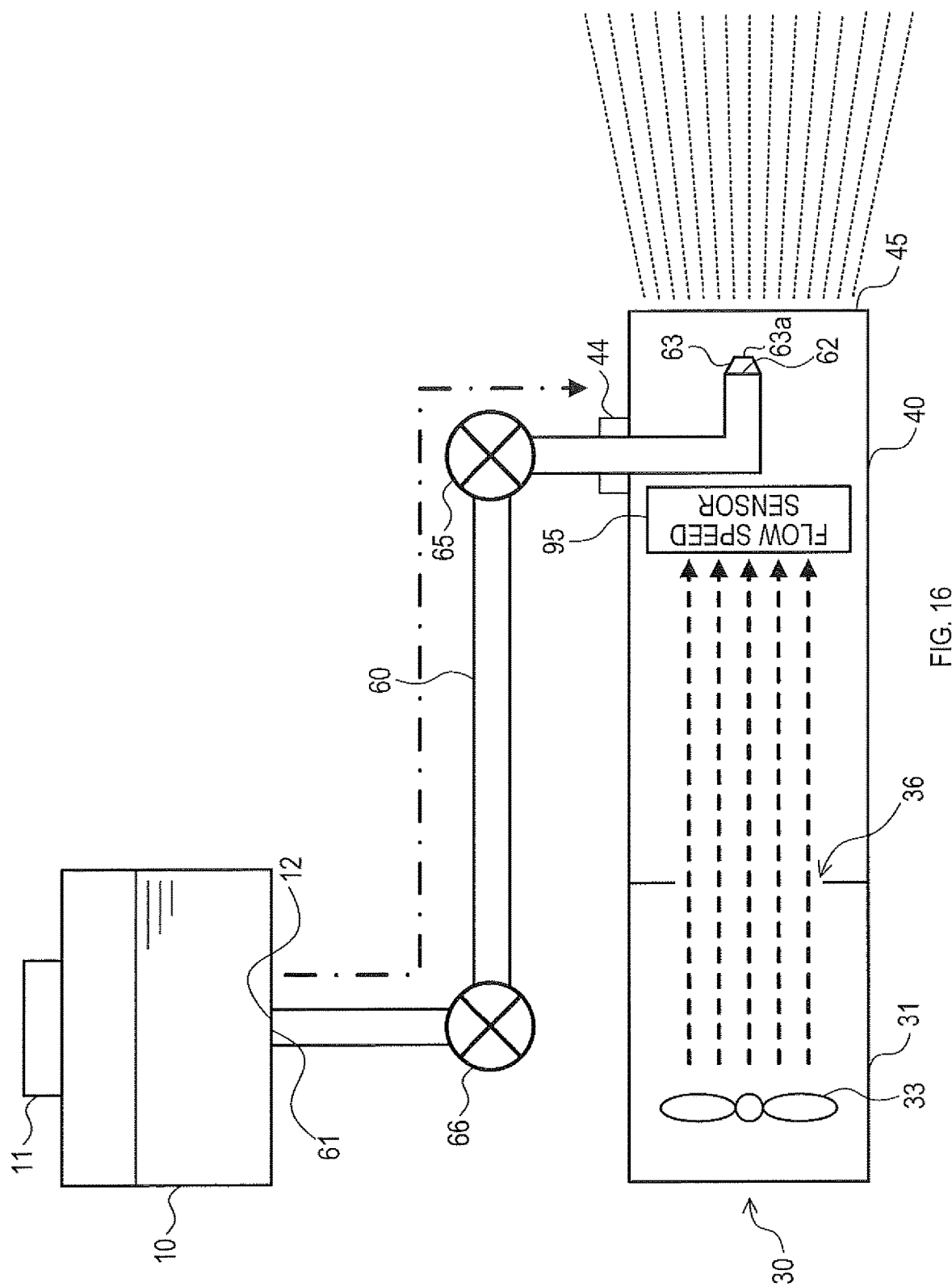
FIG. 16 is a schematic drawing showing an air passage and a liquid passage of a mist blower in a fifth embodiment.

As shown in FIG. 16, the mist blower 100 in the present fifth embodiment additionally includes a flow speed sensor 95. In the present fifth embodiment, the flow speed sensor 95 is situated downstream of the impeller 33 and upstream of the nozzle 63 in the air feed pipe 40 and close to the nozzle 63. The flow speed sensor 95 measures a flow speed V of the airflow flowing towards the nozzle 63. In other embodiments, the flow speed sensor 95 may be situated at any part in the air feed pipe 40 away from the nozzle 63.

Figure 17:
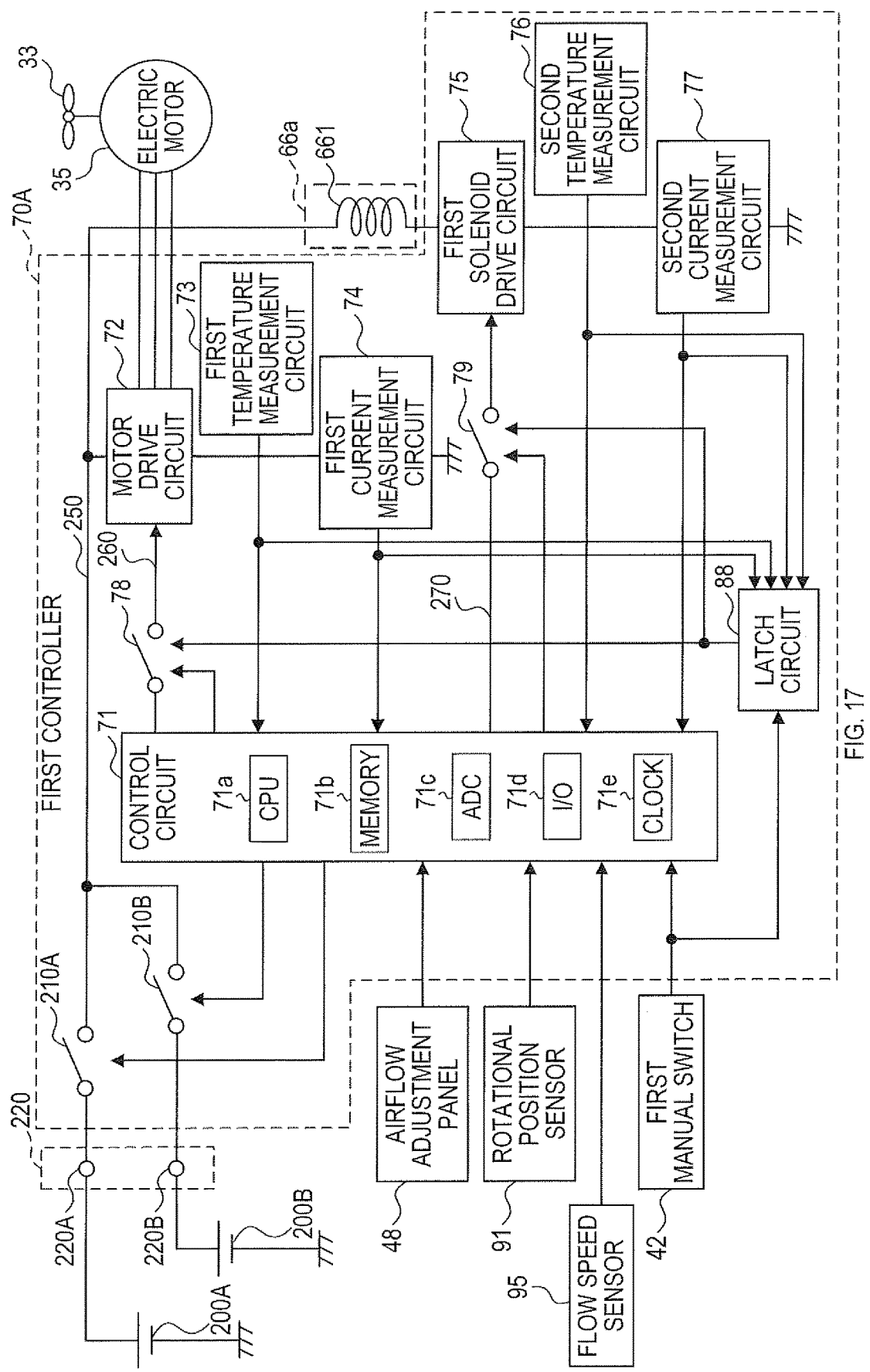
FIG. 17 is a block diagram showing an electrical configuration of the mist blower in the fifth embodiment.

As shown in FIG. 17, the flow speed sensor 95 outputs a flow speed signal to the control circuit 71. The flow speed signal has a voltage that varies in accordance with the measured flow speed V.

2-5-1-2. Fifth Control Process

Figure 18:
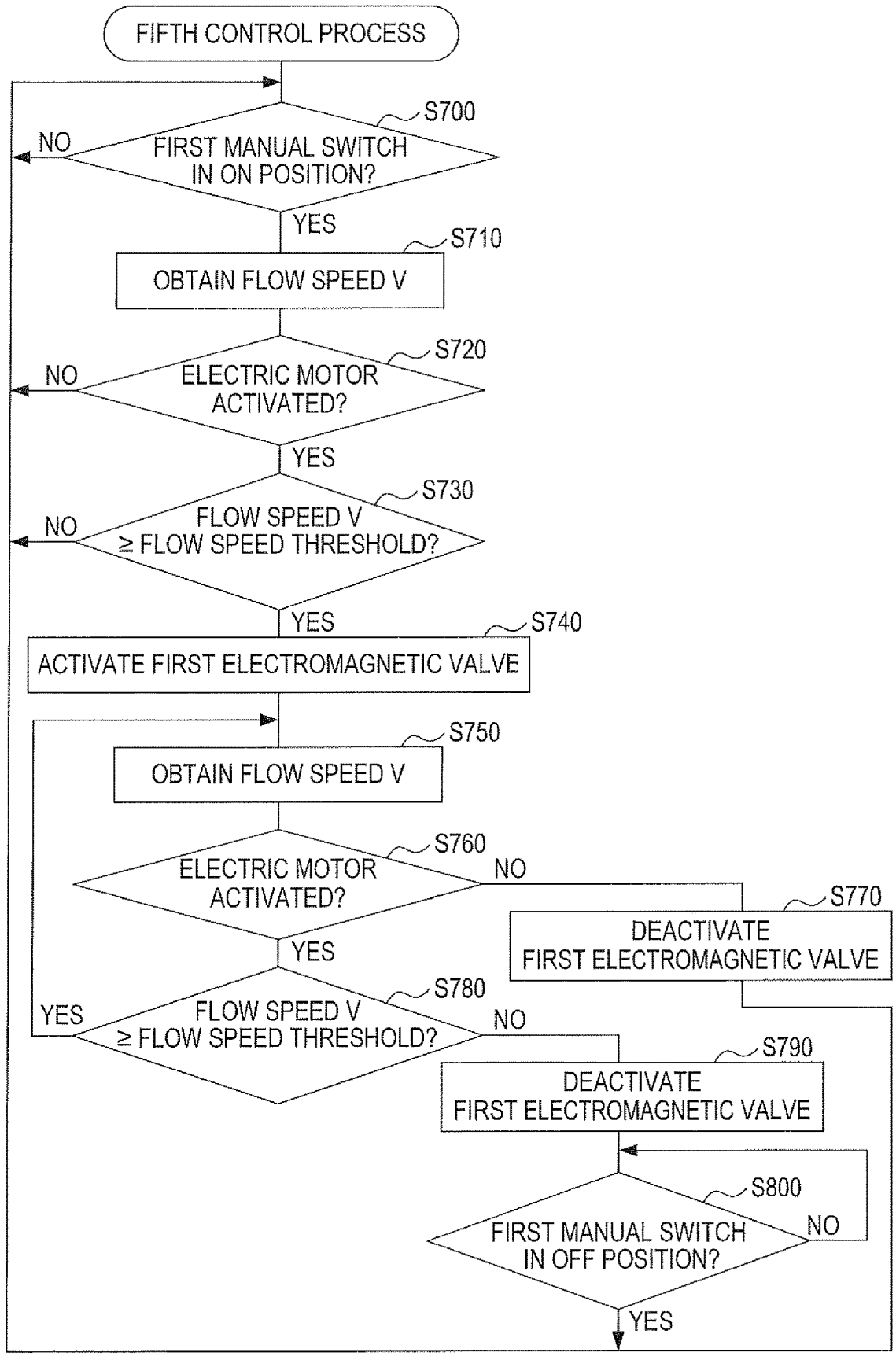
FIG. 18 is a flow chart showing a fifth control process in the fifth embodiment.

The control circuit 71 in the present fifth embodiment executes, in place of the third control process shown in FIG. 9, a fifth control process shown in FIG. 18.

As shown in FIG. 18, in S700, the control circuit 71 determines whether the first manual switch 42 is in the ON position. If the first manual switch 42 is in the ON position (S700:YES), the control circuit 71 proceeds to S710. If the first manual switch 42 is in the OFF position (S700:NO), the control circuit 71 repeats the process of S700 until the first manual switch 42 is moved to the ON position.

In S710, the control circuit 71 obtains the flow speed V. More specifically, the control circuit 71 converts the flow speed signal into a digital value via the ADC 71c and obtains the flow speed V.

In the subsequent S720, the control circuit 71 determines whether the electric motor 35 is activated. If the electric motor 35 is activated (S720:YES), the control circuit 71 proceeds to S730. If the electric motor 35 is deactivated (S720:NO), the control circuit 71 returns to S700.

In S730, the control circuit 71 determines whether the obtained flow speed V is higher than or equal to a preset flow speed threshold. The preset flow speed threshold is higher than or equal to a flow speed that generates the negative pressure at the second discharge port 63a of the nozzle 63. In the present fifth embodiment, the preset flow speed threshold is 56 m/s. In other embodiments, the preset flow speed threshold may be lower than 56 m/s or higher than 56 m/s.

If the flow speed V is higher than or equal to the preset flow speed threshold (S730:YES), the control circuit 71 proceeds to S740. If the flow speed V is lower than the preset flow speed threshold (S730:NO), the control circuit 71 returns to S700.

In S740, the control circuit 71 activates the first electromagnetic valve 66 by turning the second enabling switch 79 on and outputs the first solenoid conduction signal to the first solenoid drive circuit 75. In the present fifth embodiment, the control circuit 71 does not simultaneously initiate the activation of the first electromagnetic valve 66 with the activation of the electric motor 35. The reason being that, in a case where the flow speed V is lower than the preset flow speed threshold, the liquid discharged from the second discharge port 63a may not be atomized. The control circuit 71 initiates the activation of the first electromagnetic valve 66 once the actual rotational frequency R of the electric motor 35 is increased and the flow speed V reaches the preset flow speed threshold or higher.

In the subsequent S750, the control circuit 71 obtains the flow speed V again.

In the subsequent S760, the control circuit 71 determines whether the electric motor 35 is activated. If the electric motor 35 is activated (S760:YES), the control circuit 71 proceeds to S780. If the electric motor 35 is deactivated (S760:NO), the control circuit 71 proceeds to S770.

In S770, the control circuit 71 deactivates the first electromagnetic valve 66. In other words, the control circuit 71 turns the second enabling switch 79 off. In addition to/alternatively, the control circuit 71 outputs the first solenoid non-conduction signal to the first solenoid drive circuit 75. In other words, the control circuit 71 immediately closes the first electromagnetic valve 66 and stops discharging the liquid from the second discharge port 63a when the electric motor 35 is deactivated.

In S780, the control circuit 71 determines whether the flow speed V, which was obtained again, is higher than or equal to the preset flow speed threshold. If the flow speed V is higher than or equal to the preset flow speed threshold (S780:YES), the control circuit 71 returns to S750. If the flow speed V is lower than the preset flow speed threshold (S780:NO), the control circuit 71 proceeds to S790.

In S790, the control circuit 71 executes the same process as in S770. In the present fifth embodiment, if the flow speed V is lower than the preset flow speed threshold when the electric motor 35 is activated, the control circuit 71 closes the first electromagnetic valve 66 and stops discharging the liquid from the second discharge port 63*a*. Upon completion of the process of S790, the control circuit 71 proceeds to S800.

In S800, the control circuit 71 determines whether the first manual switch 42 is in the OFF position. If the first manual switch 42 is in the OFF position (S800:YES), the control circuit 71 returns to S700. If the first manual switch 42 is in the ON position (S800:NO), the control circuit 71 repeats the process of S800 until the first manual switch 42 is moved to the OFF position.

2-5-2. Effects in Fifth Embodiment

The mist blower 100 in the present fifth embodiment exerts, in addition to the aforementioned first through sixth effects, the following fifteenth effect.

Fifteenth Effect: In the mist blower 100 in the present fifth embodiment, the first electromagnetic valve 66 is opened after the flow speed V in the air feed pipe 40 reaches the preset flow speed threshold or higher. Accordingly, the mist blower 100 in the present fifth embodiment can adequately atomize the liquid and discharge the adequately atomized liquid.

2-6. Sixth Embodiment

The present sixth embodiment corresponds to a partially modified second embodiment. Therefore, elements that are the same as those in the second embodiment will be given the same reference numerals and their explanations will be omitted. Differences from the second embodiment will be explained hereinafter.

2-6-1. Differences from Second Embodiment 2-6-1-1. Sixth Control Process

Figure 19:
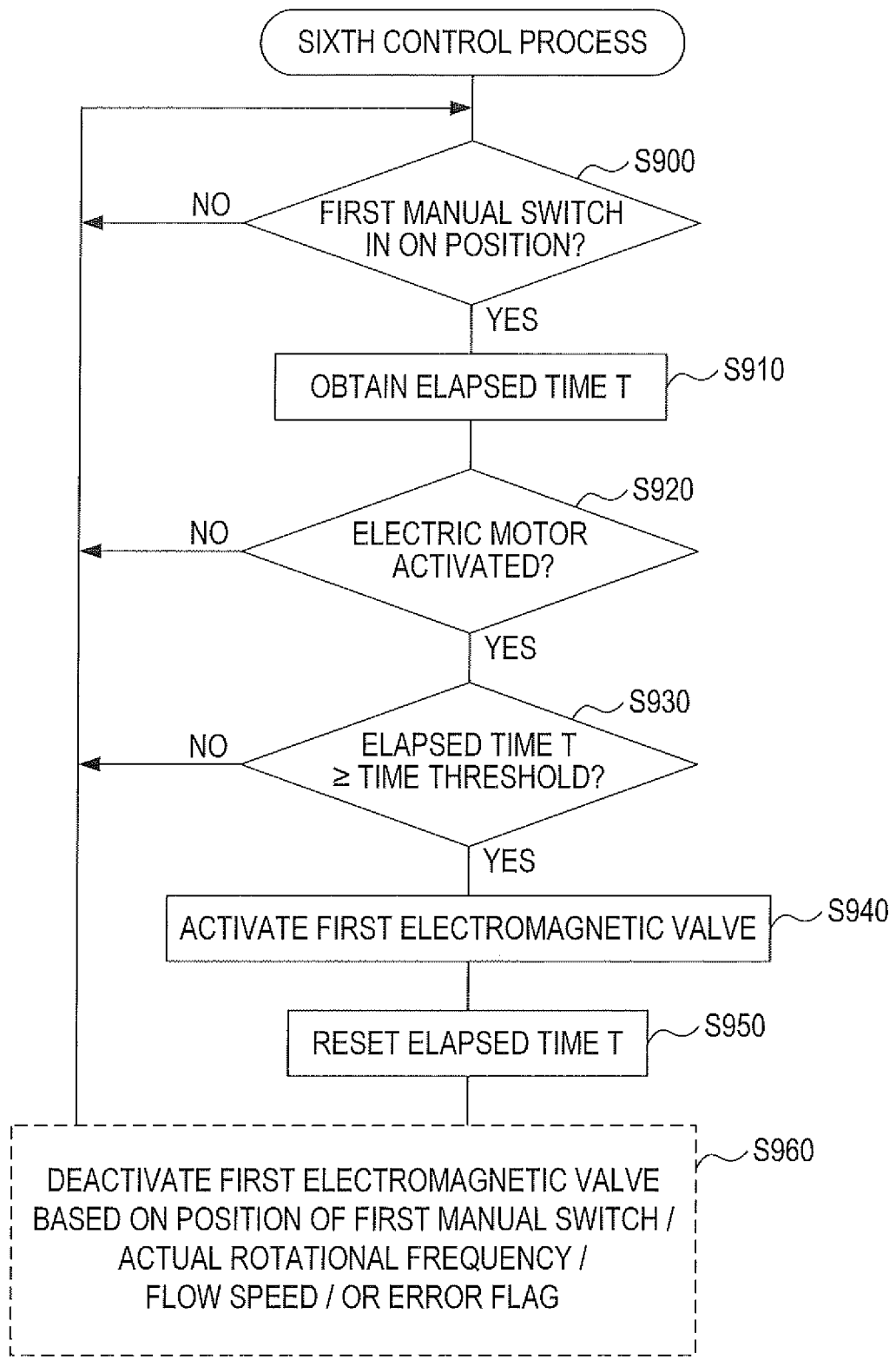
FIG. 19 is a flow chart showing a sixth control process in a sixth embodiment.

The control circuit 71 in the present sixth embodiment executes, in place of the fifth control process shown in FIG. 18, a sixth control process shown in FIG. 19.

As shown in FIG. 19, in S900, the control circuit 71 determines whether the first manual switch 42 is in the ON position. If the first manual switch 42 is in the ON position (S900:YES), the control circuit 71 proceeds to S910, If the first manual switch 42 is in the OFF position (S900:NO), the control circuit 71 repeats the process of S900 until the first manual switch 42 is moved to the ON position. In a case where (i) it is determined in the previous S900 that the first manual switch 42 is in the OFF position, and (ii) it is determined in the current S900 that the first manual switch 42 is in the ON position, the control circuit 71 starts counting an elapsed time T. In other words, if the first manual switch 42 is moved from the OFF position to the ON position, the control circuit 71 starts counting the elapsed time T. In the present sixth embodiment, the control circuit 71 counts the elapsed time T based on the clock signal generated by the clock generator 71*e*. In other embodiments, the control circuit 71 may count the elapsed time T with any device (such as a timer) other than the clock generator 71*e*.

In S910, the control circuit 71 obtains the elapsed time T. In other words, the control circuit 71 obtains a time until the current time since the first manual switch 42 is moved to the ON position.

In the subsequent S920, the control circuit 71 determines whether the electric motor 35 is activated. If the electric motor 35 is activated (S920:YES), the control circuit 71 proceeds to S930. If the electric motor 35 is deactivated (S920:NO), the control circuit 71 returns to S900.

In S930, the control circuit 71 determines whether the obtained elapsed time T is greater than or equal to a preset time threshold. The preset time threshold corresponds to a time required until the flow speed V in the air feed pipe 40 reaches the preset flow speed threshold or higher since the initiation of the activation of the electric motor 35. If the elapsed time T is greater than or equal to the preset time threshold (S930:YES), the control circuit 71 proceeds to S940. If the elapsed time T is less than the preset time threshold (S930:NO), the control circuit 71 returns to S900.

In S940, the control circuit 71 activates the first electromagnetic valve 66 by turning the second enabling switch 79 on and outputting the first solenoid conduction signal to the first solenoid drive circuit 75. In the present sixth embodiment, the control circuit 71 initiates the activation of the electric motor 35 when the first manual switch 42 is moved to the ON position; however, the control circuit 71 does not initiate the activation of the first electromagnetic valve 66. The reason being that, if the elapsed time T is less than the preset time threshold, the actual rotational frequency R of the electric motor 35 is not adequately increased and the flow speed V is insufficient, and therefore the liquid discharged from the second discharge port 63*a* may not be atomized.

In the subsequent S950, the control circuit 71 resets the elapsed time T to zero.

In the subsequent S960, the control circuit 71 deactivates the first electromagnetic valve 66 based on any one of the position of the first manual switch 42, the actual rotational frequency R, the flow speed V, or the error flag. More specifically, the control circuit 71 deactivates the first electromagnetic valve 66 by executing any of the processes from S40 through 80, the processes from S340 through S390, or the processes from S750 through S800.

2-6-2. Effects in Sixth Embodiment

The mist blower 100 of the present sixth embodiment exerts, in addition to the aforementioned first through sixth effects, the following sixteenth effect.

Sixteenth Effect: In the mist blower 100 in the present sixth embodiment, the first electromagnetic valve 66 is opened after the flow speed V in the air feed pipe 40 is sufficiently increased in response to the increase in the actual rotational frequency R of the electric motor 35. Accordingly, the mist blower 100 in the present sixth embodiment can adequately atomize the liquid discharged from the second discharge port 63*a*.

2-7. Seventh Embodiment

The present seventh embodiment corresponds to a partially modified fifth embodiment. Therefore, elements that are the same as those in the fifth embodiment will be given the same reference numerals and their explanations will be omitted. Differences from the fifth embodiment will be explained hereinafter.

2-7-1. Differences from Fifth Embodiment

2-7-1-1. Mechanical Structure

Although it is not illustrated, in the mist blower 100 in the present seventh embodiment, the container 20 and all of the components housed in the container 20 (namely, the first controller 70A, the first battery 200A, the second battery 200B, the connector 220, and the rotational position sensor 91) are excluded, and the air blower 30 is situated below the tank 10.

Figure 20:
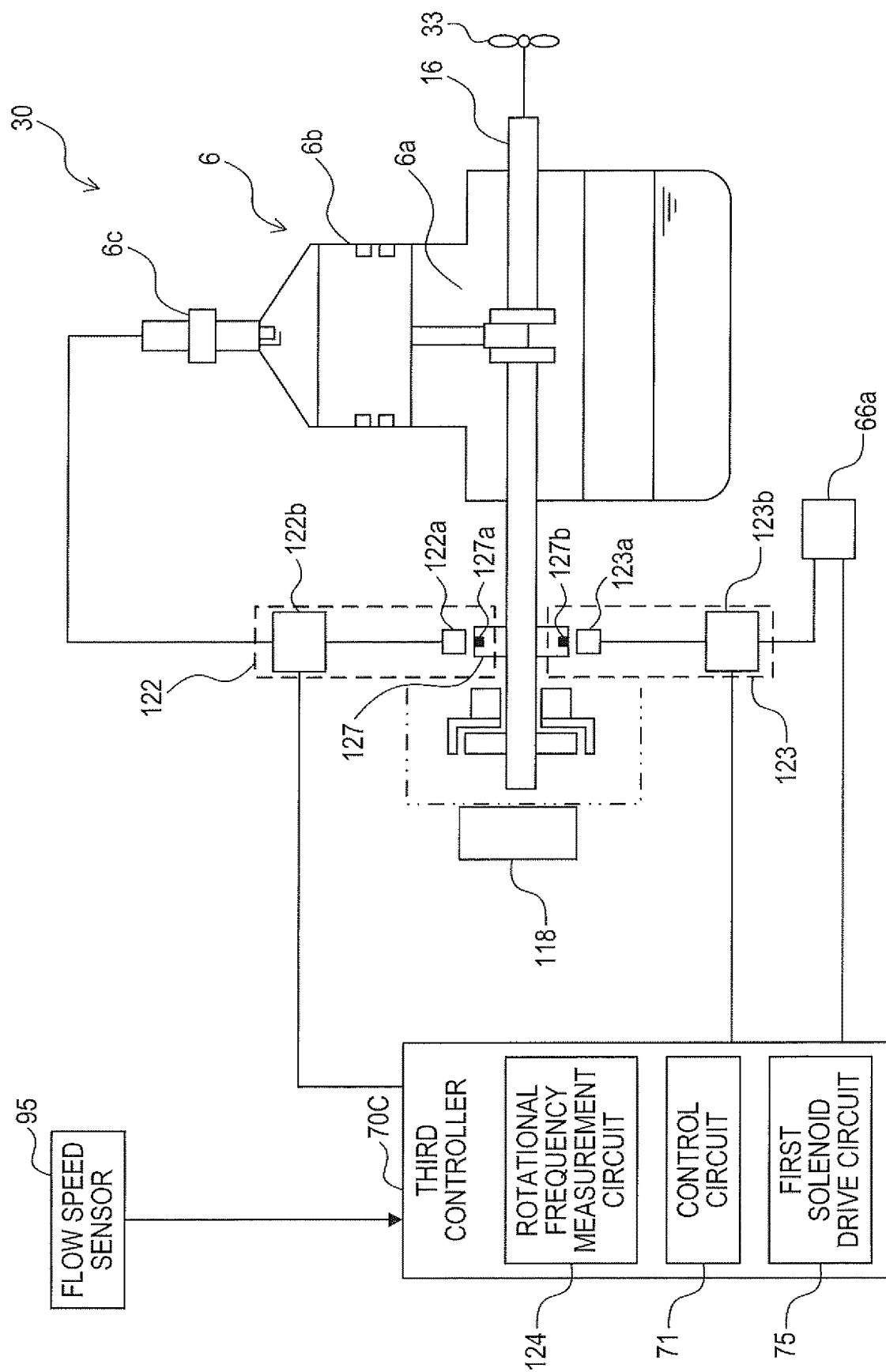
FIG. 20 is a schematic drawing showing a partial configuration of a mist blower in a seventh embodiment.

As shown in FIG. 20, the air blower 30 in the present seventh embodiment includes an internal combustion engine 6 in place of the electric motor 35. The air blower 30 in the present seventh embodiment additionally includes a third controller 70C. In other embodiments, the third controller 70C may be disposed at any part of the mist blower 100 other than the air blower 30.

In the present seventh embodiment, the internal combustion engine 6 is but not limited to be in the form of a two-stroke single-cylinder reciprocating engine or a four-stroke single-cylinder reciprocating engine.

The internal combustion engine 6 includes a shaft 16, a crank chamber 6a, a piston 6b, and an ignition plug 6c.

The air blower 30 in the present seventh embodiment additionally includes a recoil starter 118. The recoil starter 118 includes a not-shown rope. When this rope is pulled by the user, the shaft 16 rotates and a high-voltage current is intermittently supplied to the ignition plug 6c. The ignition plug 6c ignites a fuel such as gasoline supplied to the internal combustion engine 6. The piston 6b reciprocates in response to the combustion of the fuel, which causes the shaft 16 to rotate. The impeller 33 is physically coupled to the shaft 16 and rotates along with the rotation of the shaft 16. The shaft 16 includes a flywheel 127 supported by the shaft 16. The flywheel 127 includes a first permanent magnet 127a and a second permanent magnet 127b on its outer circumferential wall. The flywheel 127 rotates with the shaft 16.

The air blower 30 in the present seventh embodiment additionally includes a first electric generator 122 and a second electric generator 123.

The first electric generator 122 generates the aforementioned high-voltage current by the rotation of the shaft 16 and delivers the high-voltage current to the ignition plug 6c. The first electric generator 122 outputs, to the third controller 70C, a shaft rotation signal having a voltage that varies in accordance with the rotation of the shaft 16.

More specifically, the first electric generator 122 includes a first generating coil 122a, and a first power feeding device 122b. The first generating coil 122a is situated in the vicinity of the flywheel 127. The first generating coil 122a generates an AC power by the first permanent magnet 127a and the second permanent magnet 127b moving close to or away from the first generating coil 122a by the rotation of the shaft 16. The first power feeding device 122b intermittently generates the aforementioned high-voltage current, at an ignition timing designated by the third controller 70C, based on the AC power generated by the first generating coil 122a and delivers this high-voltage current to the ignition plug 6c. The first power feeding device 122b also generates the aforementioned shaft rotation signal based on the AC power generated by the first generating coil 122a and outputs the generated shaft rotation signal to the third controller 70C.

The second electric generator 123 generates a DC power for the third controller 70C and the first solenoid 66a by the rotation of the shaft 16 and delivers the DC power to the third controller 70C and to the first solenoid 66a.

More specifically, the second electric generator 123 includes a second generating coil 123a, and a second power feeding device 123b. The second generating coil 123a is situated in the vicinity of the flywheel 127. The second generating coil 123a generates an AC power by the first permanent magnet 127a and the second permanent magnet 127b moving close to or away from the second generating coil 123a by the rotation of the shaft 16. The second power feeding device 123b generates the aforementioned DC power based on the AC power generated by the second generating coil 123a and delivers this DC power to the third controller 70C and to the first solenoid 66a.

The third controller 70C includes the control circuit 71 and the first solenoid drive circuit 75 similarly to the first controller 70A in the fifth embodiment. As similarly to the first controller 70A in the fifth embodiment, the third controller 70C may additionally include the second electric current measurement circuit 77, the second enabling switch 79, and the latch circuit 88, which are not shown in FIG. 20.

In addition, the third controller 70C includes a rotational frequency measurement circuit 124. The rotational frequency measurement circuit 124 measures an actual rotational frequency N of the internal combustion engine 6 based on the shaft rotation signal received from the first electric generator 122.

The third controller 70C receives the flow speed signal from the flow speed sensor 95. The third controller 70C receives the manual operation signal from the first manual switch 42 through a not-shown path.

2-7-1-2. Seventh Control Process

A seventh control process executed by the control circuit 71 will be explained with reference to FIG. 21. In the present seventh embodiment, the control circuit 71 initiates the seventh control process in response to an activation of the internal combustion engine 6 by a recoil starter 118.

Figure 21:
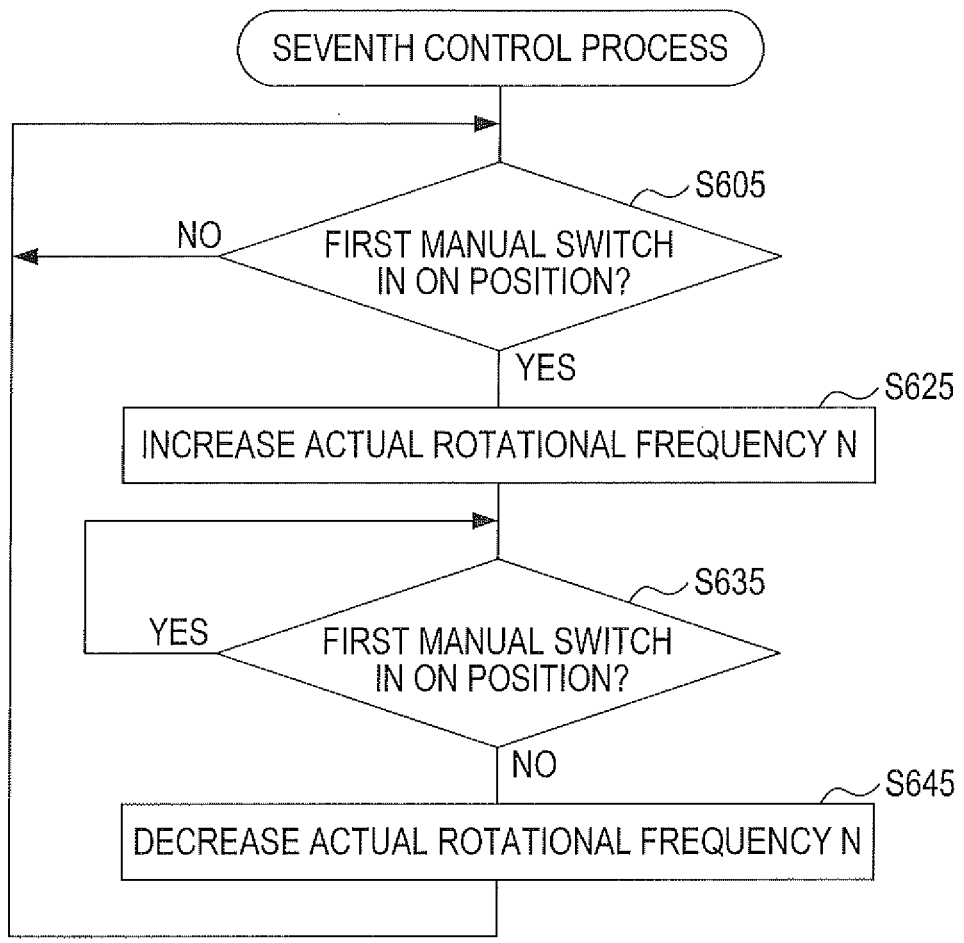
FIG. 21 is a flow chart showing a seventh control process in the seventh embodiment.

As shown in FIG. 21, in S605, the control circuit 71 executes the same process as in S600.

In the subsequent S625, the control circuit 71 adjusts the supply of the fuel, the ignition timing of the ignition plug 6c, or the like to increase the actual rotational frequency N of the internal combustion engine 6. In other words, when the first manual switch 42 is in the ON position, the control circuit 71 increases the actual rotational frequency N of the internal combustion engine 6. The control circuit 71 is electrically coupled to a not-shown fuel supplying device through a not-shown path and indicates the fuel supplying device an amount of the fuel to be supplied to the internal combustion engine 6. The control circuit 71 is electrically coupled to the first power feeding device 122b through a not-shown path and commands the first power feeding device 122b to deliver the high-voltage current to the ignition plug 6c every time the ignition timing arrives.

In the subsequent S635, the control circuit 71 executes the same process as in S630.

In the subsequent S645, the control circuit 71 adjusts the supply of the fuel, the ignition timing of the ignition plug 6c, or the like to decrease the actual rotational frequency N of the internal combustion engine 6. In other words, when the first manual switch 42 is in the OFF position, the control circuit 71 decreases the actual rotational frequency N of the internal combustion engine 6.

In response to the increase in the actual rotational frequency N of the internal combustion engine 6, the rotational frequency of the impeller 33 increases, which increases a load of the impeller 33 on the shaft 16. When the load of the impeller 33 is balanced with the output of the internal combustion engine 6, the actual rotational frequency N of the internal combustion engine 6 stops increasing.

2-7-1-3. Eighth Control Process

Figure 22:
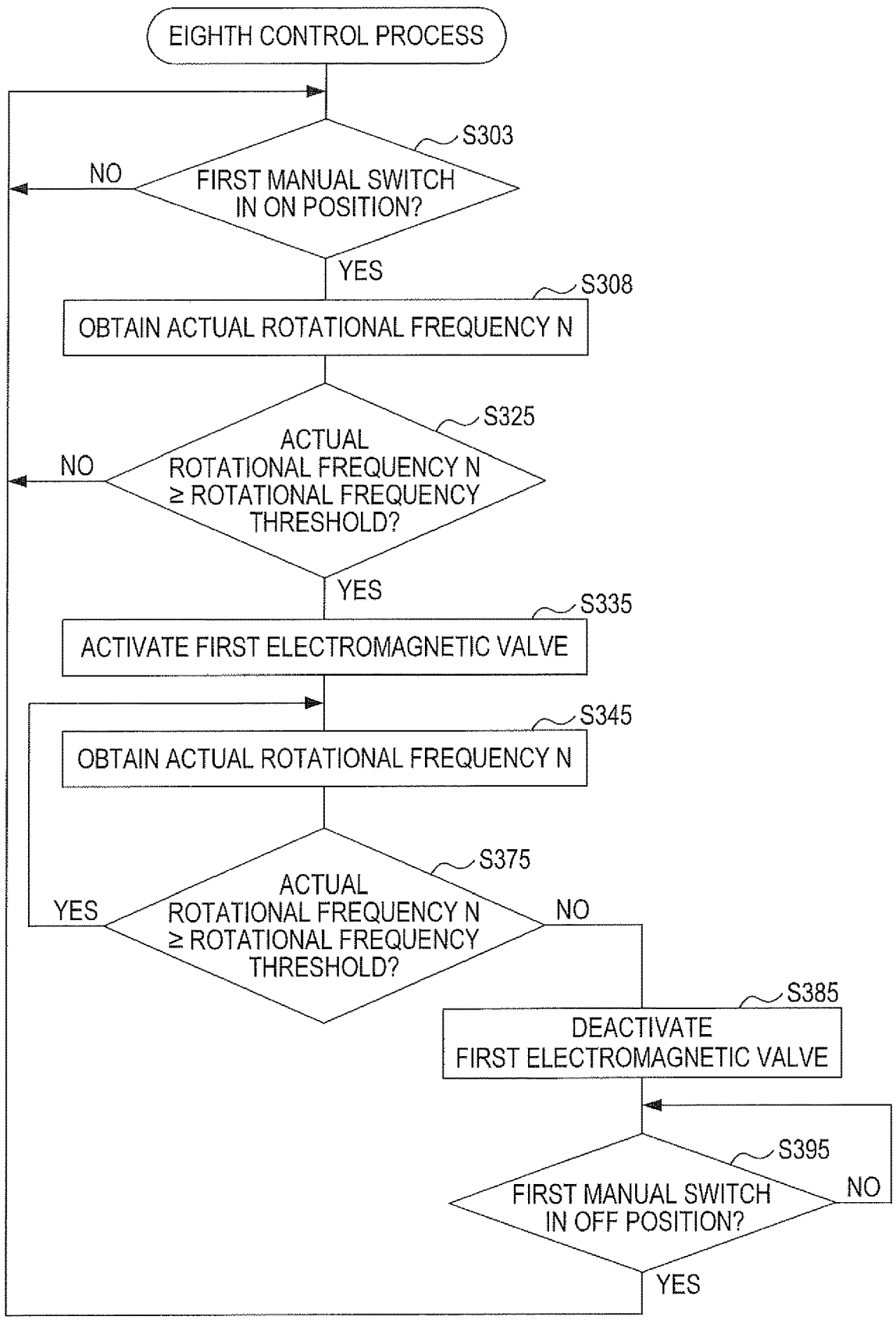
FIG. 22 is a flow chart showing an eighth control process in the seventh embodiment.

When activated, the control circuit 71 executes an eighth control process shown in FIG. 22 in addition to the seventh control process.

As shown in FIG. 22, in S303, the control circuit 71 executes the same process as in S300.

In the subsequent S308, the control circuit 71 obtains the actual rotational frequency N measured by the rotational frequency measurement circuit 124.

In the subsequent S325 and S335, the control circuit 71 executes the same processes as in S320 and S330.

In the subsequent S345, the control circuit 71 obtains the actual rotational frequency N measured by the rotational frequency measurement circuit 124 again.

In the subsequent S375 through S395, the control circuit 71 executes the same processes as in S370 through S390. The preset rotational frequency threshold in S325 and S375 corresponds to one example of the second preset rotational frequency threshold in the overview of embodiments.

2-7-2. Effects in Seventh Embodiment

The mist blower 100 in the present seventh embodiment exerts the following seventeenth and eighteenth effects.

Seventeenth Effect: In the mist blower 100 in the present seventh embodiment, when the first manual switch 42 is commanding the increase in the actual rotational frequency N of the internal combustion engine 6, the first electromagnetic valve 66 is opened; when the first manual switch 42 is commanding the decrease in the actual rotational frequency N, the first electromagnetic valve 66 is closed. The user can increase or decrease the actual rotational frequency N of the internal combustion engine 6, and at the same time, open or close the first electromagnetic valve 66 by moving the first manual switch 42.

Eighteenth Effect: In the mist blower 100 in the present seventh embodiment, in response to the actual rotational frequency N of the internal combustion engine 6 being higher than or equal to the preset rotational frequency threshold, the first electromagnetic valve 66 is opened and the liquid can be adequately atomized in the air feed pipe 40 and sprayed from the air feed pipe 40.

2-8. Eighth Embodiment

The present eighth embodiment corresponds to a partially modified seventh embodiment. Therefore, elements that are the same as those in the seventh embodiment will be given the same reference numerals and their explanations will be omitted. Differences from the seventh embodiment will be explained hereinafter.

2-8-1. Differences from Seventh Embodiment

2-8-1-1. Ninth Control Process

Figure 23:
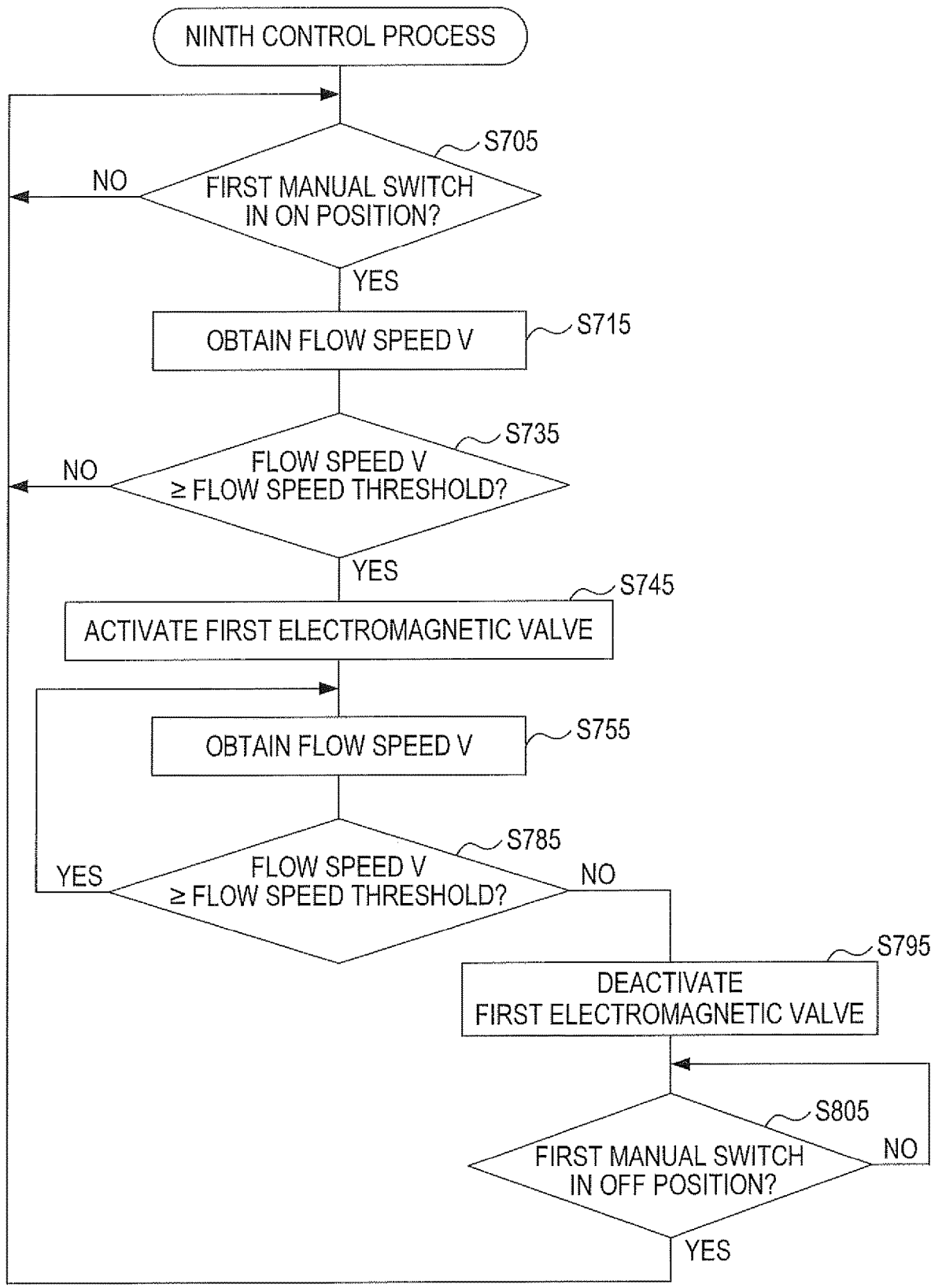
FIG. 23 is a flow chart showing a ninth control process in an eighth embodiment.

The control circuit 71 in the present eighth embodiment executes a ninth control process shown in FIG. 23 in place of the eighth control process shown in FIG. 22.

As shown in FIG. 23, in S705 and S715, the control circuit 71 executes the same processes as in S700 and S710.

In the subsequent S735 through S755, the control circuit 71 executes the same processes as in S730 through S750.

In the subsequent S785 through S805, the control circuit 71 executes the same processes as in S780 through S800.

2-8-2. Effects in Eighth Embodiment

The mist blower 100 in the present eighth embodiment exerts the aforementioned fifteenth and seventeenth effects.

2-9. Further Embodiments

Although the embodiments of the present disclosure have been explained above, the present disclosure may be implemented in various forms without being limited to the aforementioned embodiments.

In a further embodiment, any one of the second embodiment, the fifth embodiment, or the sixth embodiment may be combined with the third embodiment or the fourth embodiment. In other words, in the third embodiment or the fourth embodiment, the first electromagnetic valve 66 may be opened if (i) the actual rotational frequency R of the electric motor 35 is higher than or equal to the preset rotational frequency threshold, or (ii) the flow speed V is higher than or equal to the preset flow speed threshold, or (iii) the elapsed time T is greater than or equal to the preset time threshold; and the first electromagnetic valve 66 may be closed if (i) the actual rotational frequency R is lower than the preset rotational frequency threshold, or (ii) the flow speed V is lower than the preset flow speed threshold, or (iii) the elapsed time T is less than the preset time threshold.

In a further embodiment, any one of the first embodiment, the third embodiment, the fourth embodiment, or the sixth embodiment may be combined with the seventh embodiment or the eighth embodiment.

In the second embodiment, the motor drive signal may be in the form of a pulse width modulation signal. In this case, the control circuit 71 does not have to calculate the actual rotational frequency R and may assume the actual rotational frequency R based on a duty ratio of the motor drive signal. In other words, in S320 and S360, the control circuit 71 may determine whether the duty ratio of the motor drive signal is greater than or equal to a preset duty ratio threshold in place of determining whether the actual rotational frequency R is higher than or equal to the preset rotational frequency threshold.

In the third embodiment, in S550, when the first manual switch 42 is in the ON position, the control circuit 71 may set an additional flag, which is distinct from the error flag, to ON, When the additional flag is set to ON, the control circuit 71 may close one of the first electromagnetic valve 66 or the second electromagnetic valve 67 instead of closing both. In other words, when the opening level of the first electromagnetic valve 66 is insufficient, the control circuit 71 may close one of the first electromagnetic valve 66 or the second electromagnetic valve 67.

The mist blower 100 in the second embodiment, the third embodiment, or the fourth embodiment does not have to include the mechanical valve 65. Alternatively, the mist blower 100 in the second embodiment, the third embodiment, or the fourth embodiment does not have to include the liquid volume adjuster 44.

When the mist blower 100 in the second embodiment, the third embodiment, or the fourth embodiment does not include the liquid volume adjuster 44 but includes the mechanical valve 65, the mechanical valve 65 may be configured such that the opening level of the mechanical valve 65 is manually adjusted by the user, or the first electromagnetic valve 66 may be configured to be able to adjust its opening level.

When the mist blower 100 in the second embodiment, the third embodiment, or the fourth embodiment does not include the liquid volume adjuster 44 and the mechanical valve 65, the first electromagnetic valve 66 may be configured to be able to adjust its opening level.

Two or more functions achieved by one element in the aforementioned embodiments may be achieved by two or more elements, and one function achieved by one element may be achieved by two or more elements. In addition, two or more functions achieved by two or more elements may be achieved by one element, and one function achieved by two or more elements may be achieved by one element. A part of the configurations in the aforementioned embodiments may be omitted. Furthermore, at least a part of the configurations of the aforementioned embodiments may be added to or replaced with another part of the configurations of the aforementioned embodiments.

What is claimed is:

1. A mist blower comprising:
    an air blower configured (i) to generate or increase an airflow in response to the air blower being activated and (ii) to stop or decrease the airflow in response to the air blower being deactivated, the air blower including:
        an impeller configured to be rotated to thereby generate the airflow; and
        an electric motor configured to rotate the impeller;
    an air feed pipe (i) having a first discharge port and (ii) configured to guide the airflow from the air blower to the first discharge port;
    a tank configured to hold a liquid therein;
    a liquid feed pipe (i) having an inflow port and an outflow port and (ii) configured to guide the liquid from the inflow port to the outflow port, the inflow port being connected to the tank;
    a nozzle (i) having a second discharge port and (ii) connected to the outflow port, the second discharge port being arranged in the air feed pipe so as to discharge the liquid in the liquid feed pipe into the air feed pipe by a negative pressure generated by the airflow flowing through the air feed pipe;
    a first electromagnetic valve configured (i) to open the liquid feed pipe in response to the first electromagnetic valve being activated and (ii) to close the liquid feed pipe in response to the first electromagnetic valve being deactivated;
    a controller configured to activate or deactivate the electric motor and the first electromagnetic valve, wherein the controller is programmed to activate the first electromagnetic valve based on an actual rotational frequency of the electric motor having reached a first preset rotational frequency threshold; and
    a first manual switch configured to be manually moved by a user of the mist blower, the first manual switch being configured to command the controller to activate or deactivate the air blower based on a movement of the first manual switch.

2. The mist blower according to claim 1,
    wherein the controller is programmed to deactivate the first electromagnetic valve in association with a deactivation of the electric motor.

3. The mist blower according to claim 1, wherein the controller is programmed to:
    detect that the controller is in a fault condition; and
    deactivate the first electromagnetic valve based on the controller detecting that the controller is in the fault condition.

4. The mist blower according to claim 1, further comprising:
    a second manual switch (i) configured to be manually moved by the user and (ii) distinct from the first manual switch, the second manual switch being configured to designate a volume of the liquid to be discharged from the second discharge port based on a movement of the second manual switch,
    wherein the controller is programmed to control an opening level of the first electromagnetic valve based on the volume of the liquid designated by the second manual switch.

5. The mist blower according to claim 1, further comprising:
    a flow rate sensor configured to measure a flow rate of the liquid flowing through the liquid feed pipe.

6. The mist blower according to claim 1, further comprising:
    a second electromagnetic valve configured (i) to open the liquid feed pipe in response to the second electromagnetic valve being activated and (ii) to close the liquid feed pipe in response to the second electromagnetic valve being deactivated.

7. The mist blower according to claim 1, further comprising:
    a mechanical valve configured to be manually operated by the user to thereby open or close the liquid feed pipe.

8. The mist blower according to claim 7,
    wherein the liquid feed pipe is provided with the first electromagnetic valve and the mechanical valve, and
    wherein the mechanical valve is arranged so as to receive the liquid having passed the first electromagnetic valve.

9. The mist blower according to claim 7,
    wherein the liquid feed pipe is provided with the first electromagnetic valve and the mechanical valve, and
    wherein the first electromagnetic valve is arranged so as to receive the liquid having passed the mechanical valve.

10. The mist blower according to claim 1, further comprising:
    a connector configured to be connected to a battery,
    wherein the first electromagnetic valve includes a solenoid, and
    wherein the controller is configured to:
    receive an electric power from the battery connected to the connector;
    respectively deliver a first drive current and a second drive current to the electric motor and the solenoid to thereby respectively activate the electric motor and the first electromagnetic valve; and
    respectively interrupt the first drive current and the second drive current to thereby respectively deactivate the electric motor and the first electromagnetic valve.

11. The mist blower according to claim 1,
wherein the second discharge port is arranged inside the air feed pipe.

12. The mist blower according to claim 11,
wherein the nozzle has an outer shape gradually narrower towards the second discharge port, and
wherein the nozzle is positioned inside the air feed pipe with the second discharge port facing a downstream of the airflow.

13. The mist blower according to claim 1,
wherein the first preset rotational frequency threshold corresponds to a rotational frequency of the electric motor required to generate the airflow that sufficiently atomizes the liquid.

14. The mist blower according to claim 1,
wherein the controller is programmed to activate the first electromagnetic valve based on an actual rotational frequency of the electric motor having reached a first preset rotational frequency threshold.

15. The mist blower according to claim 14, further comprising
a rotational position sensor configured to detect a rotational position of the electric motor,
wherein the controller is programmed to measure the actual rotational frequency of the electric motor based on the rotational position detected.

16. The mist blower according to claim 15,
wherein the rotational position sensor is a Hall effect sensor.

17. The mist blower according to claim 15,
wherein the rotational position sensor is attached to the electric motor.

18. A mist blower comprising:
an air blower configured (i) to generate or increase an airflow in response to the air blower being activated and (ii) to stop or decrease the airflow in response to the air blower being deactivated, the air blower including:
an impeller configured to be rotated to thereby generate the airflow; and
an electric motor configured to rotate the impeller;
an air feed pipe (i) having a first discharge port and (ii) configured to guide the airflow from the air blower to the first discharge port;
a tank configured to hold a liquid therein;
a liquid feed pipe (i) having an inflow port and an outflow port and (ii) configured to guide the liquid from the inflow port to the outflow port, the inflow port being connected to the tank;
a nozzle (i) having a second discharge port and (ii) connected to the outflow port, the second discharge port being arranged in the air feed pipe so as to discharge the liquid in the liquid feed pipe into the air feed pipe by a negative pressure generated by the airflow flowing through the air feed pipe;
a first electromagnetic valve configured (i) to open the liquid feed pipe in response to the first electromagnetic valve being activated and (ii) to close the liquid feed pipe in response to the first electromagnetic valve being deactivated;
a controller configured to activate or deactivate the air blower and the first electromagnetic valve;
a first manual switch configured to be manually moved by a user of the mist blower, the first manual switch being configured to command the controller to activate or deactivate the air blower based on a movement of the first manual switch;
a connector configured to be connected to a battery; and
a rotational position sensor configured to detect a rotational position of the electric motor,
wherein the first electromagnetic valve includes a solenoid,
wherein the controller is configured (i) to activate the electric motor to thereby activate the air blower and (ii) to deactivate the electric motor to thereby deactivate the air blower,
wherein the controller is configured to:
receive an electric power from the battery connected to the connector;
respectively deliver a first drive current and a second drive current to the electric motor and the solenoid to thereby respectively activate the electric motor and the first electromagnetic valve; and
respectively interrupt the first drive current and the second drive current to thereby respectively deactivate the electric motor and the first electromagnetic valve,
wherein the controller is configured to activate the first electromagnetic valve based on an actual rotational frequency of the electric motor having reached a first preset rotational frequency threshold, and
wherein the controller is configured to measure the actual rotational frequency of the electric motor based on the rotational position detected.

19. The mist blower according to claim 18, wherein the rotational position sensor is attached to the electric motor.

20. The mist blower according to claim 1, further comprising a shoulder strap configured to be placed over a shoulder of the user.

21. The mist blower according to claim 1, further comprising
a connector (i) disposed below the tank and (ii) configured to be connected to a battery.

22. The mist blower according to claim 1,
wherein the first electromagnetic valve is disposed below the tank.

23. The mist blower according to claim 18,
wherein the rotational position sensor is a Hall effect sensor.

* * * * *